(12) United States Patent
Khoshnevisan et al.

(10) Patent No.: US 12,507,284 B2
(45) Date of Patent: Dec. 23, 2025

(54) ENHANCED UPLINK POWER CONTROL FOR PHYSICAL RANDOM ACCESS CHANNEL AFTER INITIAL ACCESS

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/320,922

(22) Filed: May 14, 2021

(65) Prior Publication Data

US 2022/0369382 A1 Nov. 17, 2022

(51) Int. Cl.
*H04W 74/0833* (2024.01)
*H04W 52/14* (2009.01)
*H04W 52/24* (2009.01)
*H04W 72/1263* (2023.01)

(52) U.S. Cl.
CPC ..... *H04W 74/0841* (2013.01); *H04W 52/146* (2013.01); *H04W 52/242* (2013.01); *H04W 72/1263* (2013.01)

(58) Field of Classification Search
None
See application file for complete search history.

(56) References Cited

U.S. PATENT DOCUMENTS

| | | | | |
|---|---|---|---|---|
| 2017/0273028 A1* | 9/2017 | Medina Acosta | ..... | H04W 76/27 |
| 2018/0027498 A1* | 1/2018 | Won | ..... | H04W 52/146 |
| | | | | 455/522 |
| 2019/0215781 A1* | 7/2019 | Jeon | ..... | H04W 76/32 |
| 2019/0289555 A1* | 9/2019 | Zhang | ..... | H04W 52/14 |
| 2019/0320394 A1 | 10/2019 | Sun et al. | | |
| 2020/0367172 A1* | 11/2020 | Wernersson | ..... | H04B 7/0617 |
| 2020/0396764 A1* | 12/2020 | Lin | ..... | H04W 74/0833 |
| 2022/0271890 A1* | 8/2022 | Grossmann | ..... | H04L 5/0051 |

FOREIGN PATENT DOCUMENTS

| | | | | |
|---|---|---|---|---|
| WO | WO-2020092985 A1 * | 5/2020 | ..... | H04W 52/146 |
| WO | 2021155817 A1 | 8/2021 | | |

OTHER PUBLICATIONS

International Search Report and Written Opinion—PCT/US2022/025032—ISA/EPO—Jul. 22, 2022 14 Pages.

* cited by examiner

*Primary Examiner* — Derrick W Ferris
*Assistant Examiner* — Keith Follansbee
(74) *Attorney, Agent, or Firm* — Shumaker & Sieffert PA

(57) ABSTRACT

Aspects of the disclosure relate to a wireless communication device selecting an uplink (UL) power level for an initial message in a random access procedure. For example, the wireless communication device may receive, via a transceiver, an indication that indicates an UL power level calculation technique to use for a random access procedure. The wireless communication device may further determine an UL power level for an initial message in the random access procedure using the UL power level calculation technique. The wireless communication device may further transmit, via the transceiver, the initial message for the random access procedure using the UL power level. Other aspects, embodiments, and features are also claimed and described.

30 Claims, 14 Drawing Sheets

ENHANCED UPLINK POWER CONTROL FOR PHYSICAL RANDOM ACCESS CHANNEL AFTER INITIAL ACCESS

TECHNICAL FIELD

The technology discussed below relates generally to wireless communication systems, and more particularly, to uplink power levels in random access procedures.

INTRODUCTION

User equipment (UEs) in a communication system may adjust transmission power levels for uplink (UL) communications to a base station based on measurements of downlink (DL) communications received from the base station. By adjusting the transmission power, UEs may avoid transmissions that use more power than necessary to be received by a base station, and may avoid transmission that are at too low of a power level to be received by a base station.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some scenarios, determining a power level for an uplink (UL) communication based on a typical measurement of a downlink (DL) communication results in an UL power level that is excessive. For example, when the UL communication is an initial message in a random access procedure that the user equipment (UE) transmits to an UL receiver (Rx) point or to a supplemental UL, an UL power level based on measurements of the DL communication may be higher than necessary or desired for reception.

In some aspects, the present disclosure provides a process for a wireless communication device (e.g., a UE) to determine an UL power level for an initial message in a random access procedure based on an UL power level calculation technique selected from a plurality of UL power level calculation techniques. The particular UL power level calculation technique that the wireless communication device selects may be based on an indication received by the wireless communication device, for example, from a base station via control signaling. The selected UL power level calculation technique may provide an improved UL power level that, for example, uses less power than would otherwise be used in an initial message in a random access procedure, but that is still at a sufficient strength to be received by an intended recipient.

In one example, an apparatus for wireless communication is disclosed. The apparatus includes a processor, a transceiver communicatively coupled to the processor, and a memory communicatively coupled to the processor. The processor and the memory are configured to receive, via the transceiver, an indication that indicates an uplink (UL) power level calculation technique to use for a random access procedure. The processor and the memory are further configured to determine an UL power level for an initial message in the random access procedure using the UL power level calculation technique. The processor and the memory are further configured to transmit, via the transceiver, the initial message for the random access procedure using the UL power level.

In one example, a method for wireless communication is disclosed. The method includes receiving an indication that indicates an uplink (UL) power level calculation technique to use for a random access procedure. The method further includes determining an UL power level for an initial message in the random access procedure using the UL power level calculation technique. The method also includes transmitting the initial message for the random access procedure using the UL power level.

In one example, an apparatus for wireless communication is disclosed. The apparatus includes means for receiving an indication that indicates an uplink (UL) power level calculation technique to use for a random access procedure. The apparatus also includes means for determining an UL power level for an initial message in the random access procedure using the UL power level calculation technique. The apparatus further includes means for transmitting the initial message for the random access procedure using the UL power level.

In one example, a non-transitory computer-readable medium storing computer-executable code including code for causing a computer to receive an indication that indicates an uplink (UL) power level calculation technique to use for a random access procedure; to determine an UL power level for an initial message in the random access procedure using the UL power level calculation technique; and to transmit the initial message for the random access procedure using the UL power level.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

Figure 1:
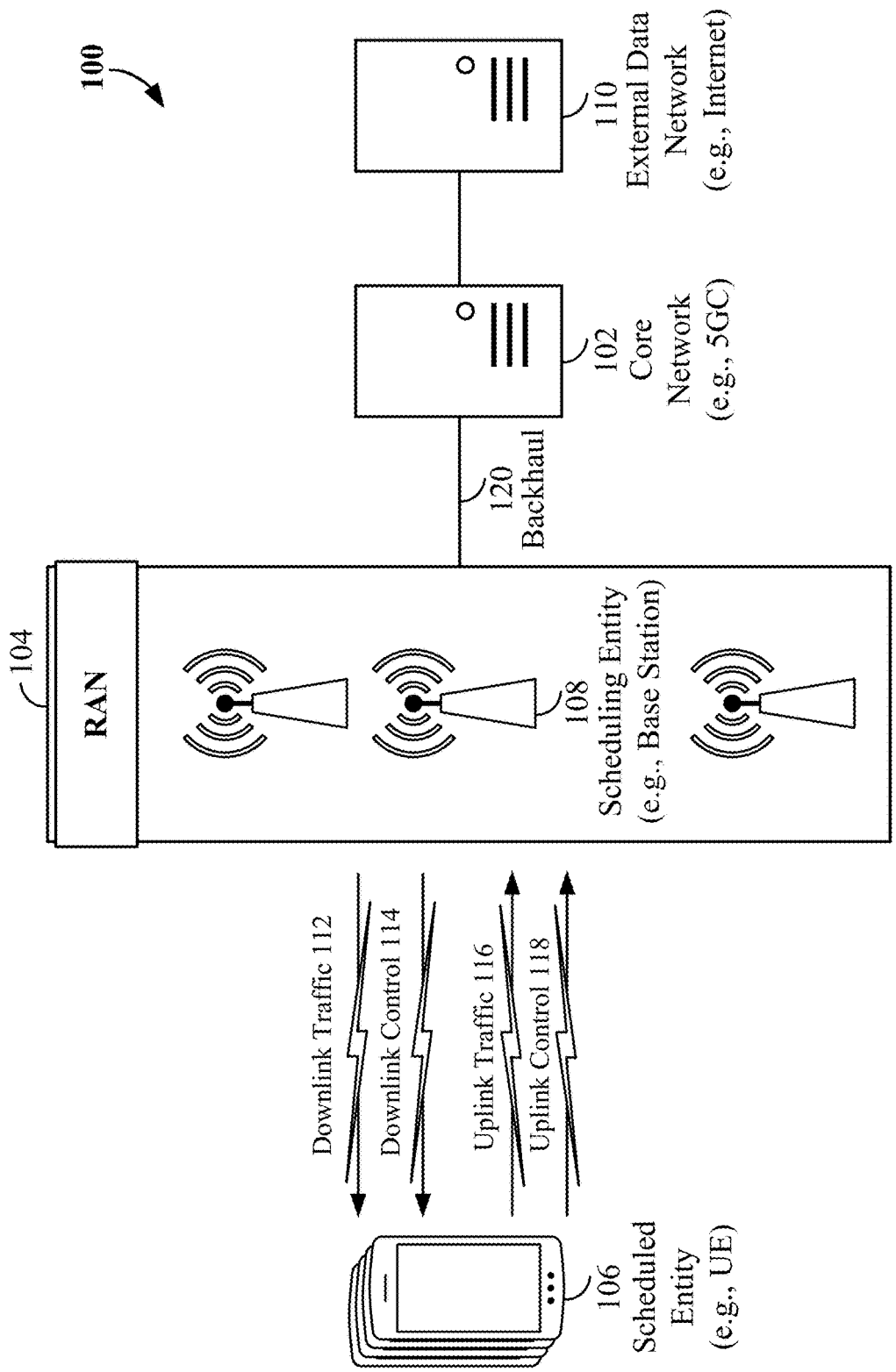
FIG. 1 is a schematic illustration of a wireless communication system according to some embodiments.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a mobile apparatus and a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this technique may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
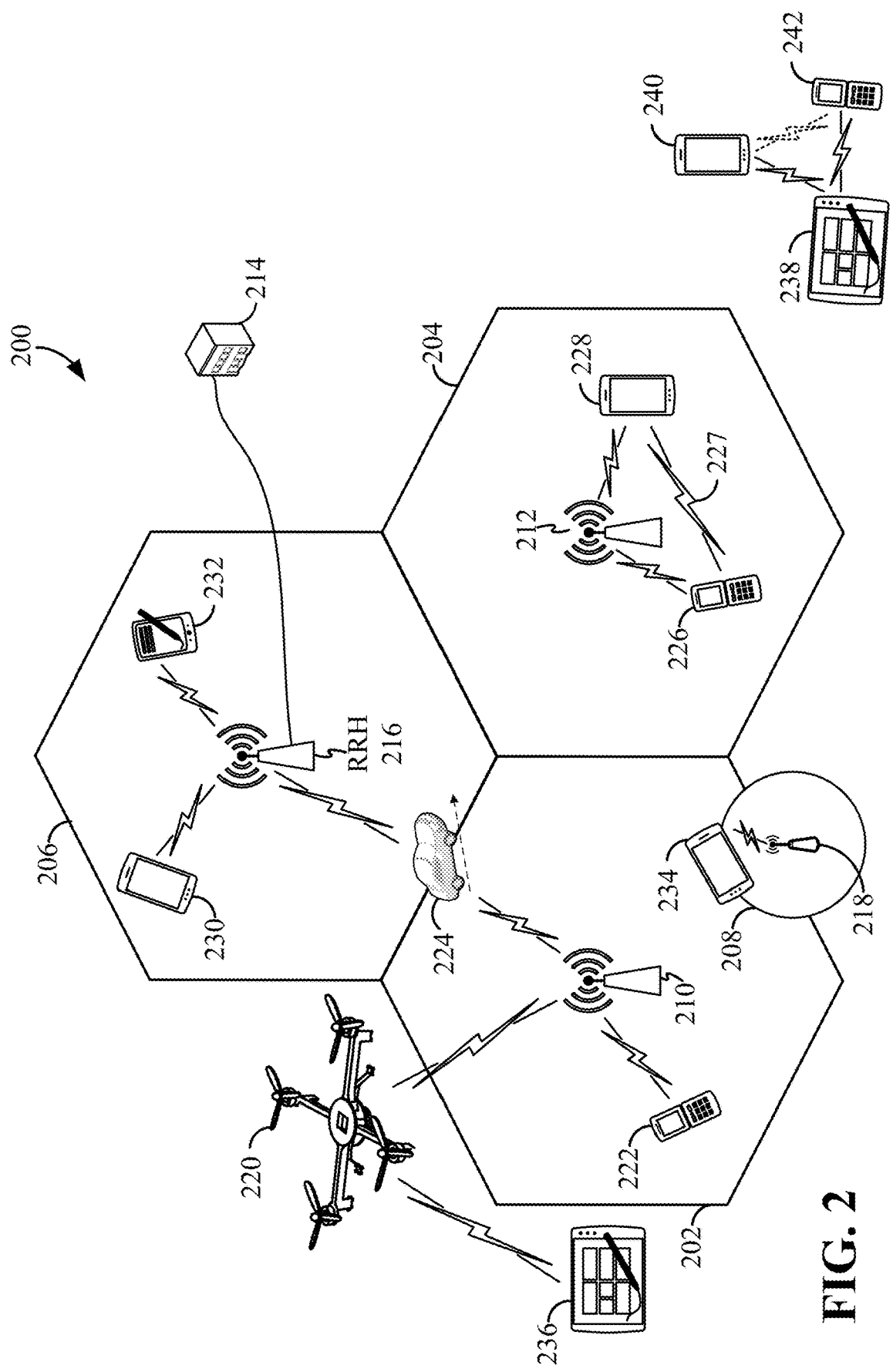
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Figure 3:
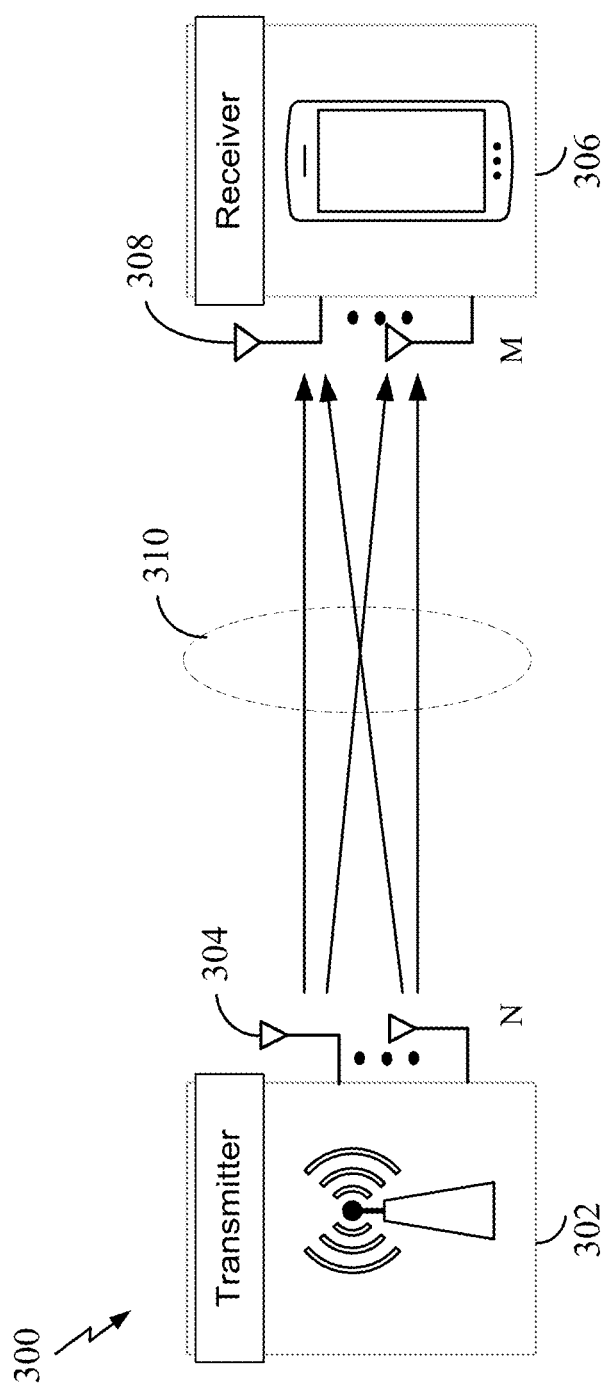
FIG. 3 is a block diagram illustrating a wireless communication system supporting multiple-input multiple-output (MIMO) communication according to some embodiments.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In the case shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

Figure 4:
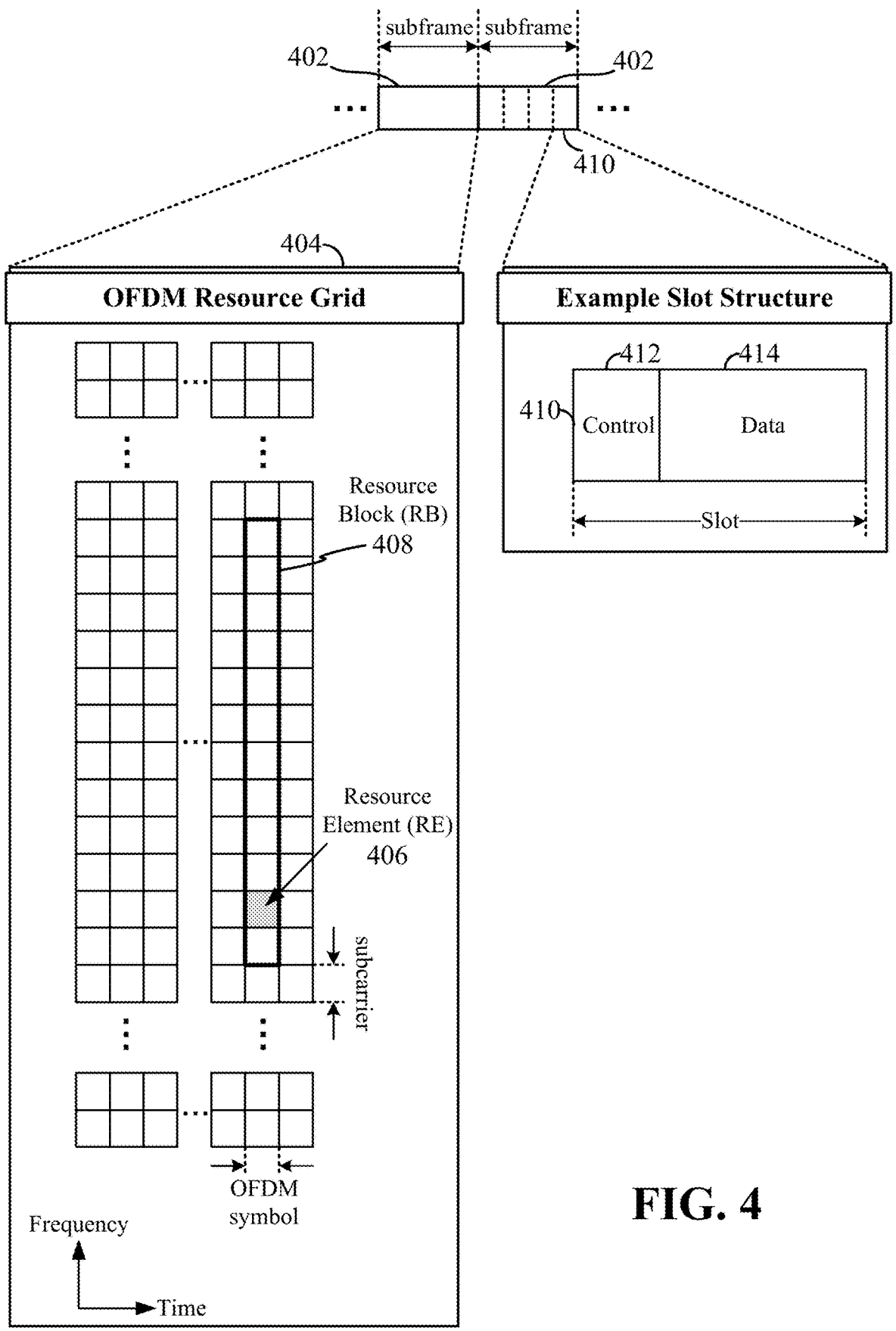
FIG. 4 is a schematic illustration of an organization of wireless resources in an air interface utilizing orthogonal frequency divisional multiplexing (OFDM) according to some embodiments.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 408 entirely corresponds to a single direction of communication (either transmission or reception for a given device).

A UE generally utilizes only a subset of the resource grid 404. An RB may be the smallest unit of resources that a scheduler can allocate to a UE. Thus, the more RBs scheduled for a UE, and the higher the modulation technique chosen for the air interface, the higher the data rate for the UE.

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

Each 1 ms subframe 402 may consist of one or multiple adjacent slots. In FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 5:
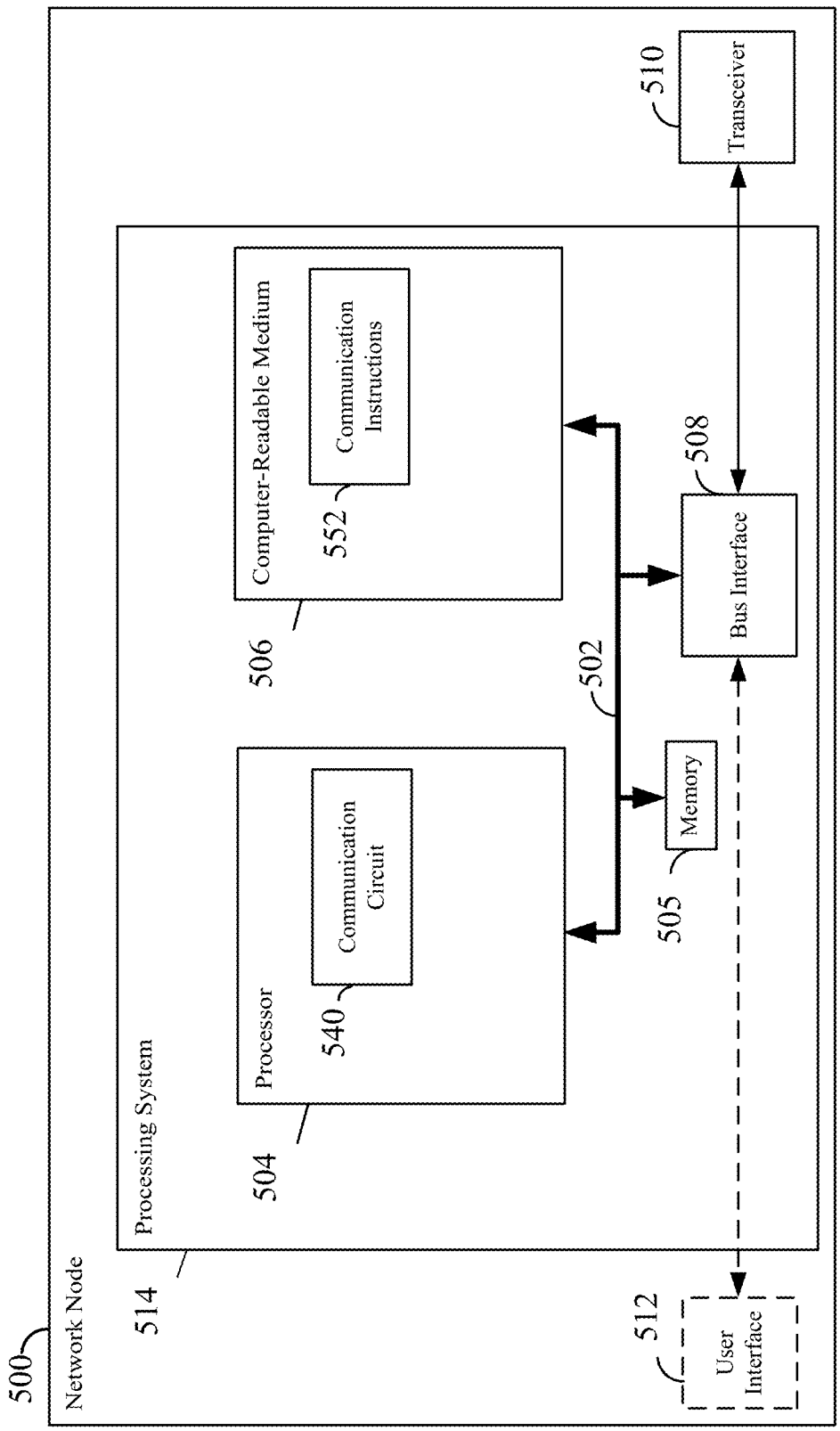
FIG. 5 is a block diagram conceptually illustrating an example of a hardware implementation for a network node according to some embodiments.

FIG. 5 is a block diagram illustrating an example of a hardware implementation for a network node 500 employing a processing system 514. For example, the network node 500 may be a scheduling entity (e.g., a base station) or an uplink reception point (UL Rx point, described below), as illustrated in any one or more of FIGS. 1, 2, 3, 7, 8A, and/or 8B. In another example, the network node 500 may be a user equipment as illustrated in any one or more of FIGS. 1, 2, 3, 7, 8A, and/or 8B.

The network node 500 may include a processing system 514 having one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 500 may be configured to perform any one or more of the functions described herein. That is, the processor 504, as utilized in a network node 500, may be configured (e.g., in coordination with the memory 505) to, for example, transmit indications via control signaling to scheduled entities (e.g., UEs) and receive uplink communications from scheduled entities (e.g., UEs), as referenced with respect to one or more of the processes and procedures described below and illustrated in FIG. 9.

The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and some examples, such as a base station, may omit it.

Figure 8A:
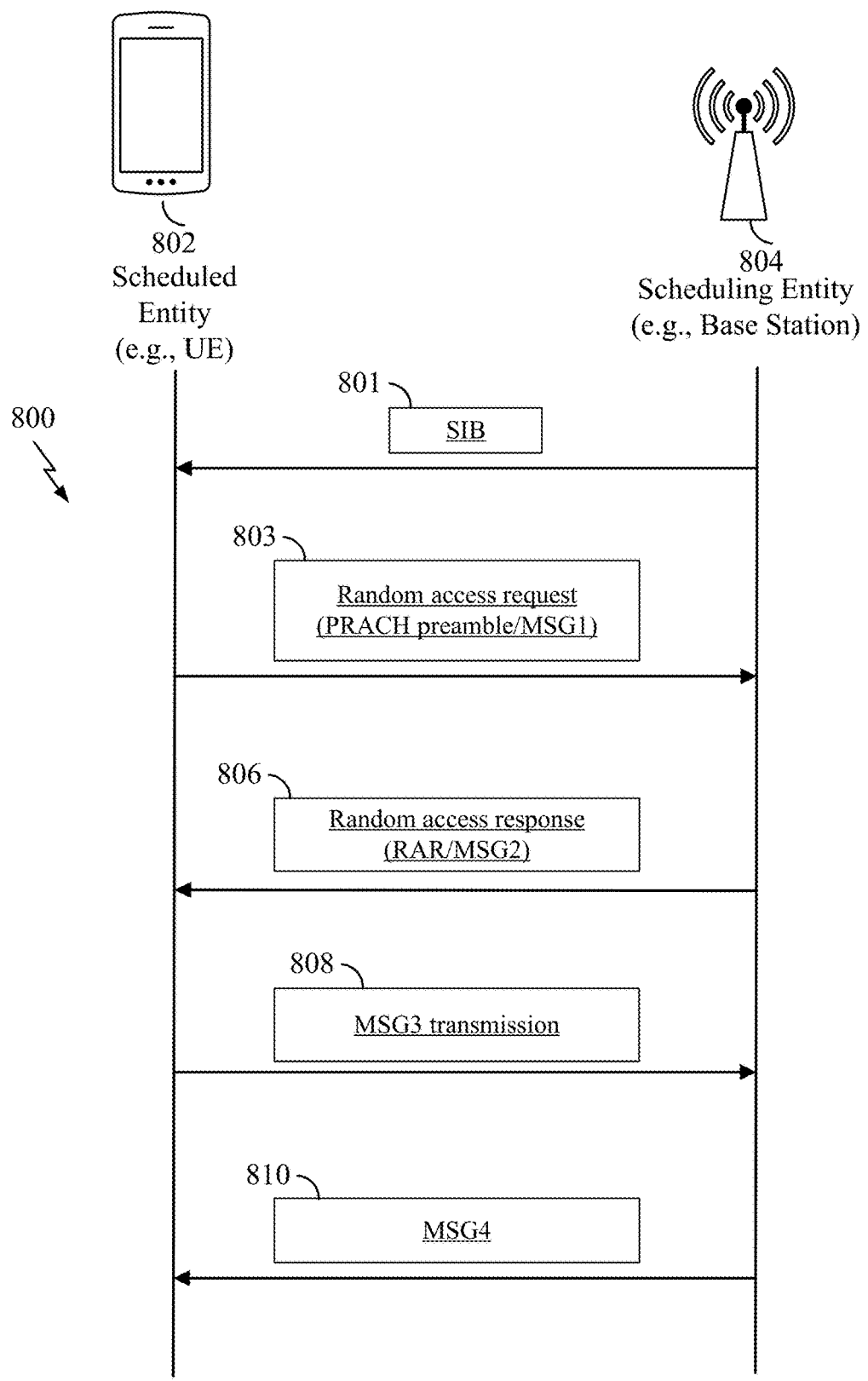
FIG. 8A illustrates a contention-based random access procedure according to some embodiments.
Figure 8B:
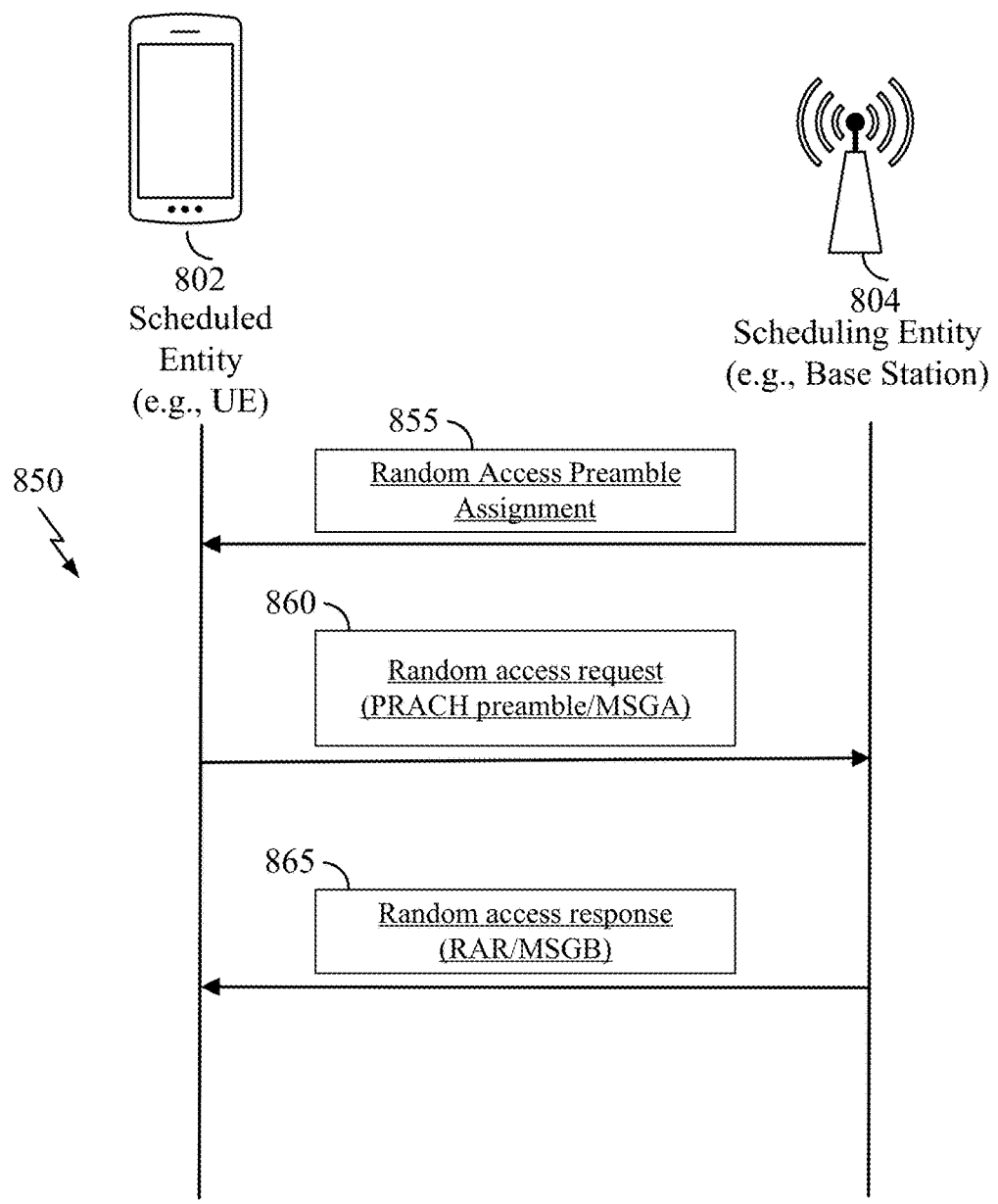
FIG. 8B illustrates a contention-free random access procedure according to some embodiments.
Figure 9:
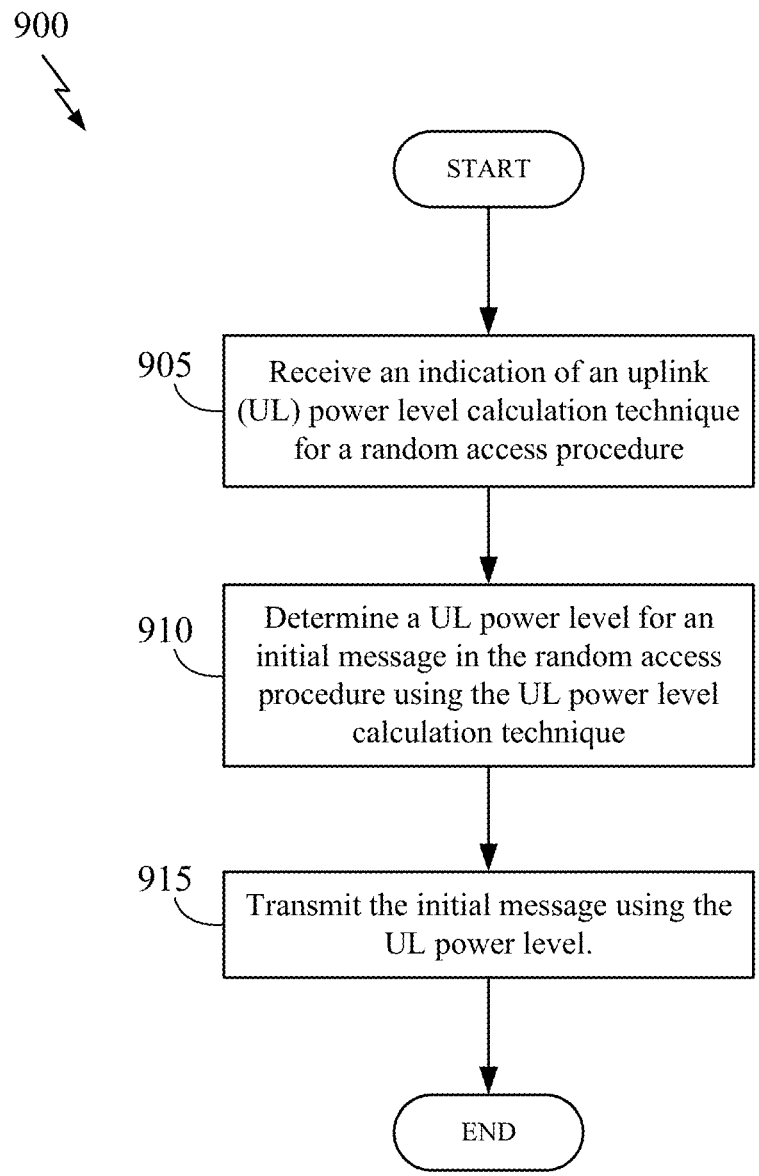
FIG. 9 is a flow chart illustrating an exemplary process for wireless communication according to some embodiments.
Figure 10:
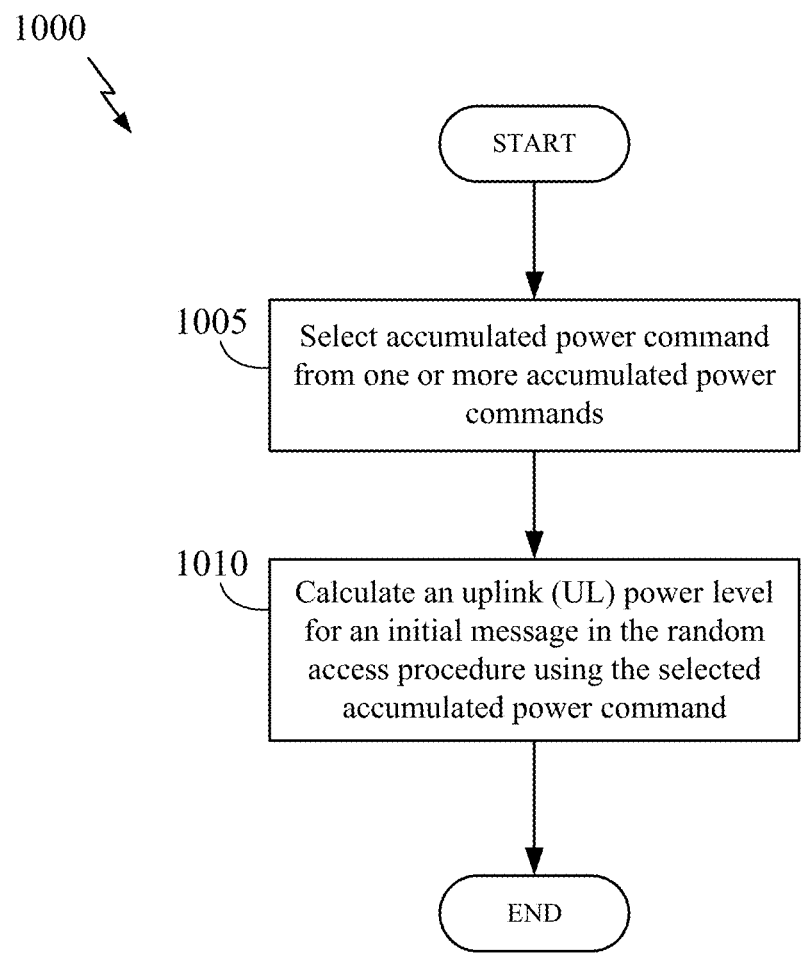
FIG. 10 is a flow chart illustrating an exemplary process for an accumulated power command calculation technique according to some embodiments.
Figure 11:
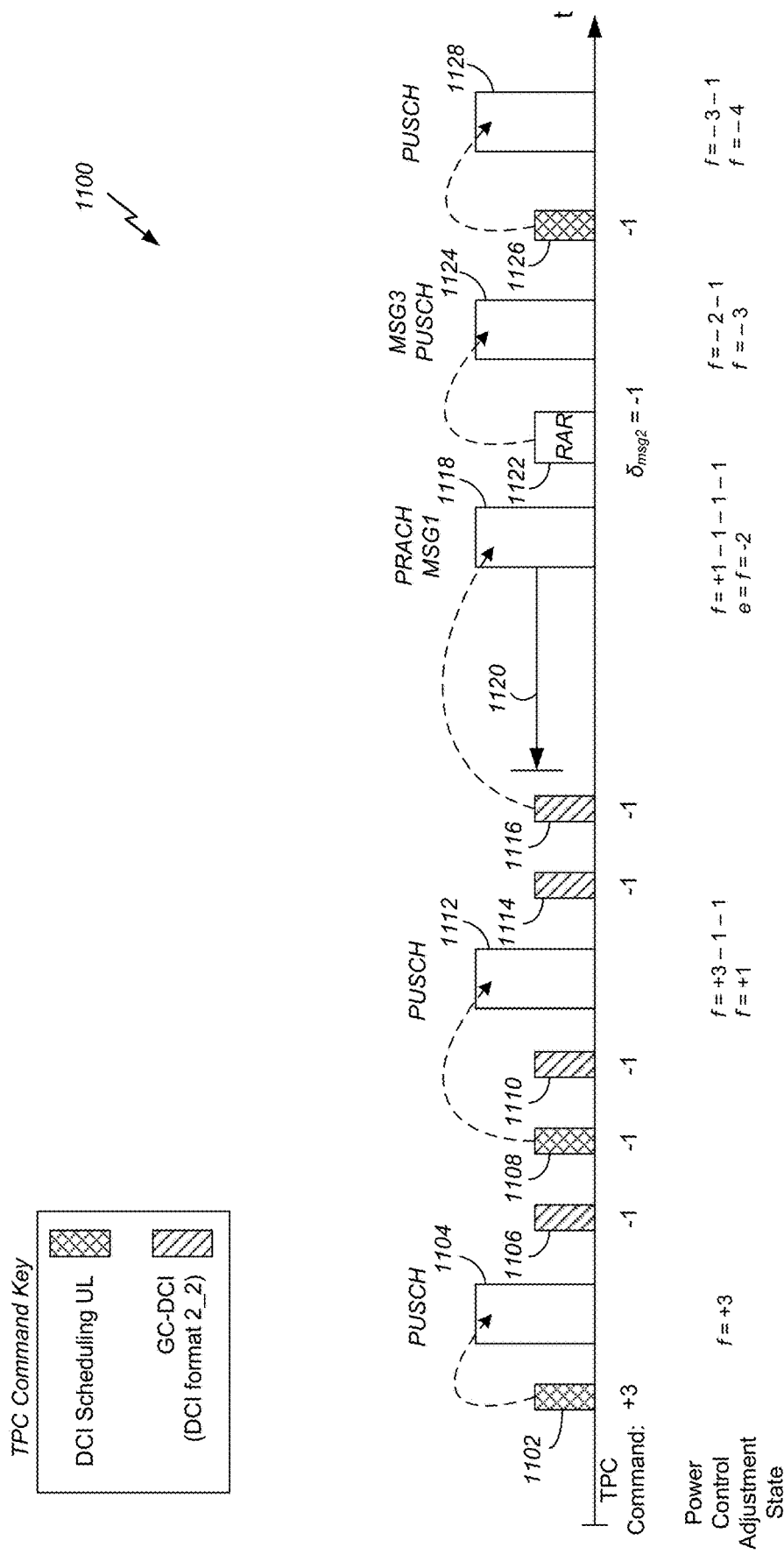
FIG. 11 shows a timeline illustrative an accumulated TPC command calculation technique according to some embodiments.
Figure 12:
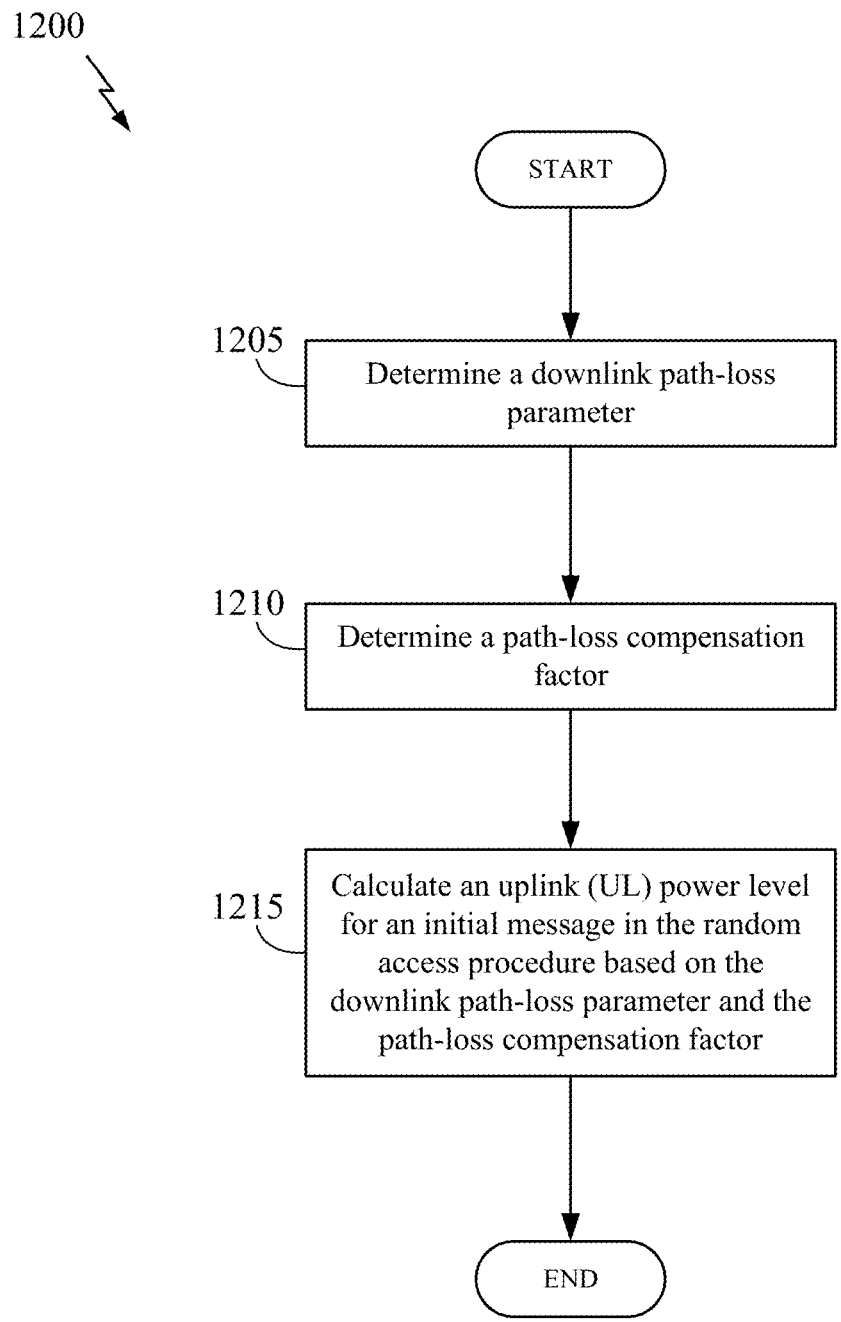
FIG. 12 is a flow chart illustrating an exemplary process for a partial path-loss compensation calculation technique according to some embodiments.
Figure 13:
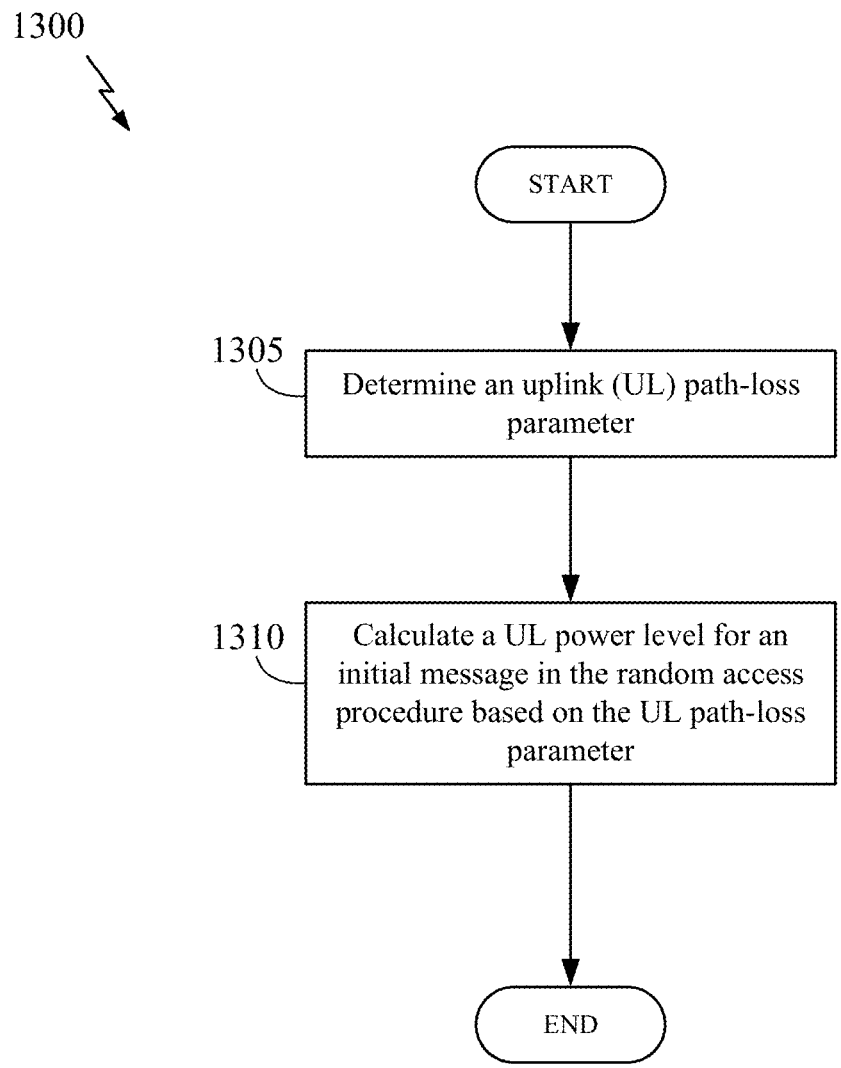
FIG. 13 is a flow chart illustrating an exemplary process for an indicated UL path-loss calculation technique according to some embodiments.

In some aspects of the disclosure, the processor 504 may include communication circuitry 540 configured (e.g., in coordination with the memory 505) for various functions, including, e.g., determining and transmitting indications via control signaling to scheduled entities, transmitting PDCCH orders to scheduled entities for initiating random access procedures, executing random access procedures with scheduled entities, determining an UL path-loss parameter, and/or receiving uplink communications from scheduled entities, such as described with respect to the diagrams of FIGS. 8A-B and/or FIG. 11, and/or the processes 900 of FIG. 9, 1000 of FIG. 10, 1200 of FIG. 12, and/or 1300 of FIG. 13.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 06 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may store computer-executable code that includes communication instructions 560 that configure a network node 500 for various functions, including, e.g., determining and transmitting indications via control signaling to scheduled entities, transmitting PDCCH orders to scheduled entities for initiating random access procedures, executing random access procedures with scheduled entities, determining an UL path-loss parameter, and/or receiving uplink communications from scheduled entities, such as described with respect to the diagrams of FIGS. 8A-B and/or FIG. 11, and/or the processes 900 of FIG. 9, 1000 of FIG. 10, 1100 of FIG. 11, 1200 of FIG. 12, and/or 1300 of FIG. 13.

Figure 6:
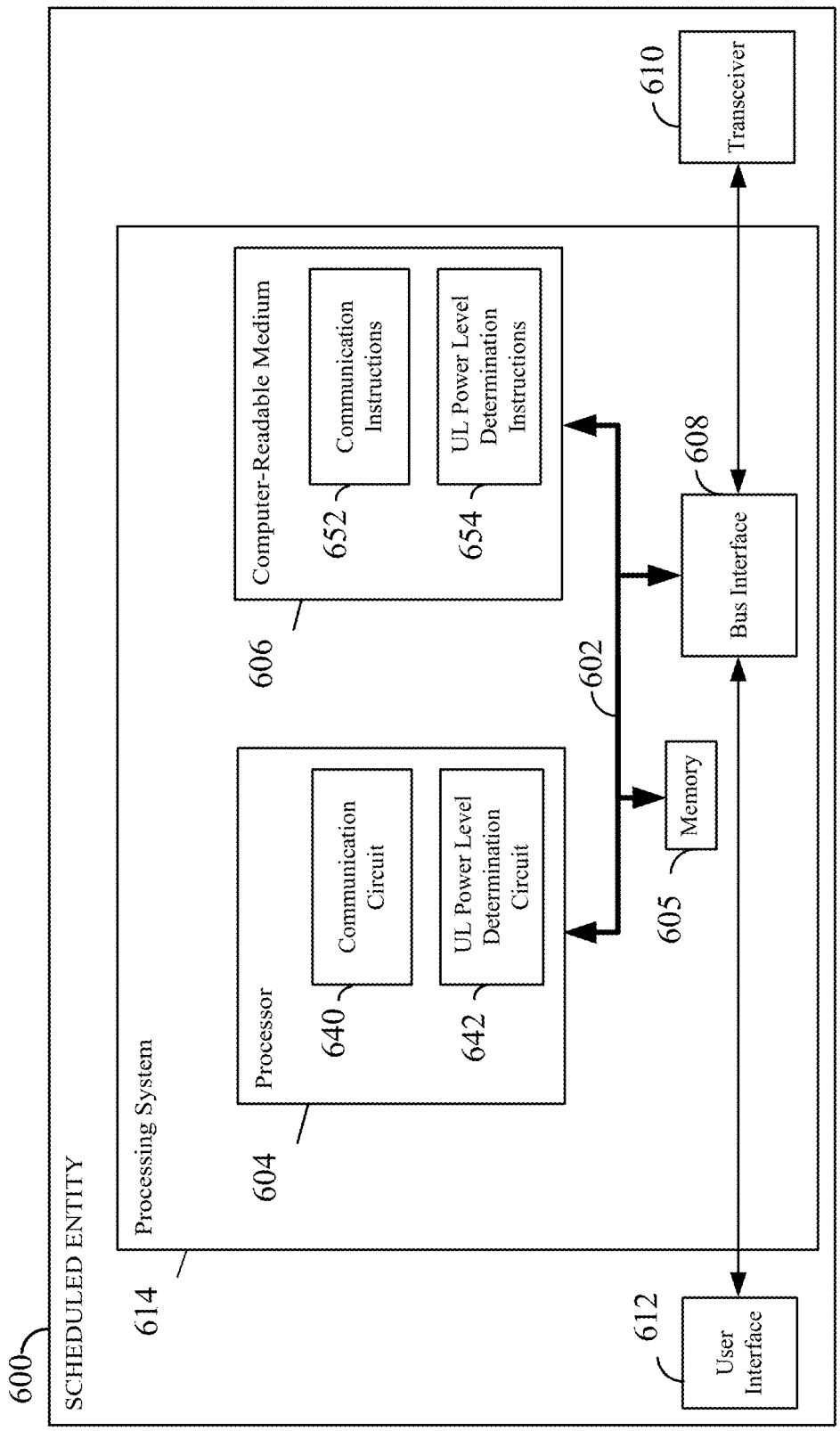
FIG. 6 is a block diagram conceptually illustrating an example of a hardware implementation for a scheduled entity according to some embodiments.

FIG. 6 is a conceptual diagram illustrating an example of a hardware implementation for an exemplary scheduled entity 600 employing a processing system 614. In accordance with various aspects of the disclosure, a processing system 614 may include an element, or any portion of an element, or any combination of elements having one or more processors 604. For example, the scheduled entity 600 may be a user equipment (UE) as illustrated in any one or more of FIGS. 1, 2, 3, 7, 8A, and/or 8B.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be configured (e.g., in coordination with the memory 605) to implement any one or more of the processes described below and illustrated in FIG. 9.

In some aspects of the disclosure, the processor 604 may include communication circuitry 640 configured (e.g., in coordination with the memory 605) for various functions, including, for example, receiving indications (e.g., via control signaling from scheduling entities) and transmitting UL communications. For example, the communication circuitry 640 may be configured to implement one or more of the functions described below in relation to FIG. 9 including, e.g., blocks 905 and/or 915. The processor 604 may further include UL power level determination circuitry 642 (e.g., in coordination with the memory 605) for various functions, including, for example, determining an UL power level for UL communications. For example, the UL power level determination circuitry 642 may be configured to implement one or more of the functions described below in relation to FIG. 9 including, e.g., block 910; in relation to FIG. 10 including, e.g., blocks 1005 and/or 1010; in relation to FIG. 12 including, e.g., blocks 1205, 1210, and/or 1215; and/or in relation to FIG. 13 including, e.g., blocks 1305 and/or 1310.

And further, the computer-readable storage medium 606 may store computer-executable code that includes communication instructions 652 that configure a scheduled entity 600 for various functions, including, e.g., receiving indications (e.g., via control signaling from scheduling entities) and transmitting UL communications. For example, the communication instructions 652 may be configured to cause a scheduled entity 600 to implement one or more of the functions described below in relation to FIG. 9, including, e.g., blocks 905 and/or 915. The computer-readable storage medium 606 may further store computer-executable code that includes UL power level determination instructions 654 that configure a scheduled entity 600 for various functions, including, e.g., determining an UL power level for UL communications. For example, the UL power level determination instructions 654 may be configured to cause a scheduled entity 600 to implement one or more of the functions described below in relation to FIG. 9, including, e.g., block 910; in relation to FIG. 10 including, e.g., blocks 1005 and/or 1010; in relation to FIG. 12 including, e.g., blocks 1205, 1210, and/or 1215; and/or in relation to FIG. 13 including, e.g., blocks 1305 and/or 1310.

In one configuration, the apparatus 600 for wireless communication includes means for receiving an indication that indicates an uplink (UL) power level calculation technique to use for a random access procedure; means for determining an UL power level for an initial message in the random access procedure using the UL power level calculation technique; and means for transmitting the initial message for the random access procedure using the UL power level. In some configurations, the apparatus 600 for wireless communication includes means for selecting an accumulated power command from one or more accumulated power commands; and means for calculating an UL power level for an initial message in a random access procedure using the selected accumulated power command. In some configurations, the apparatus 600 for wireless communication includes means for determining a DL path-loss parameter; means for determining a path-loss compensation factor; and means for calculating an UL power level for an initial message in a random access procedure based on the DL path-loss parameter and the path-loss compensation factor. In some configurations, the apparatus 600 for wireless communication includes means for receiving an UL path-loss parameter; and means for calculating a UL power level for an initial message in a random access procedure based on the UL path-loss parameter. In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 7, 8A, and/or 8B, and utilizing, for example, the processes and/or algorithms described herein in relation to FIGS. 9, 10, 11, 12, and/or 13.

Figure 7:
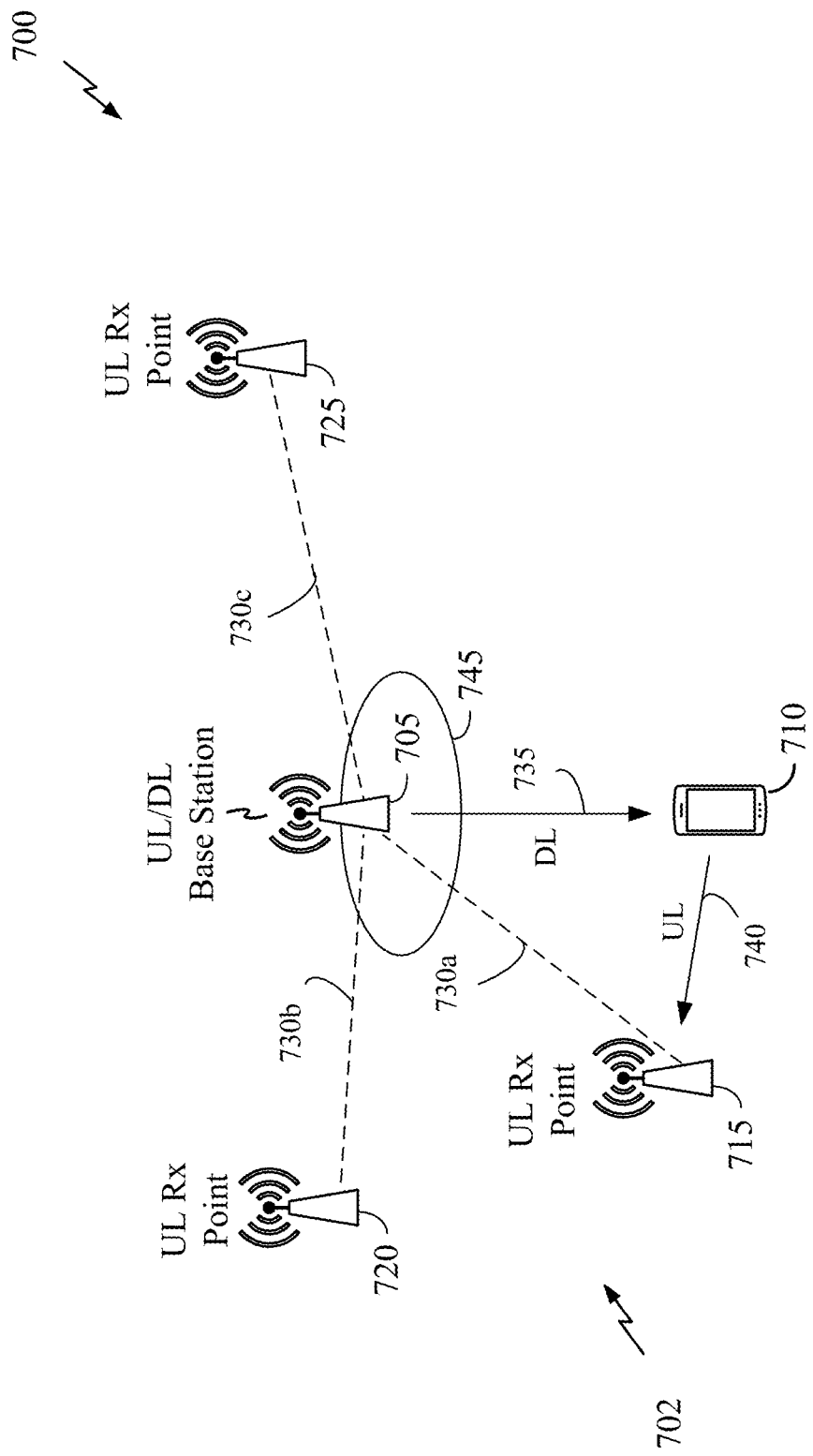
FIG. 7 illustrates a communication system according to some embodiments.

FIG. 7 illustrates a communication system 700 including a radio area network (RAN) 702 that includes a scheduling entity, illustrated as a base station 705, configured for both uplink (UL) and downlink (DL) communications with scheduled entities, such as user equipment (UE) 710. The RAN 702 further includes uplink reception points (UL Rx points) 715, 720, and 725 that are configured to receive uplink communications from scheduled entities, such as the UE 710. The UL Rx points 715, 720, and 725 are connected by a backhaul network, which may be similar to the backhaul 120 of FIG. 1, and that includes backhaul connections 730a, 730b, and 730c. One or more of the base stations 705 and/or UL RX points 715, 720, and 725 may be an implementation of the network node 500 of FIG. 5. The UE 728 may be an implementation of the scheduled entity 600 of FIG. 6.

The UL Rx points 715, 720, and 725 may be receive-only points that are configured to receive UL communications, but not downlink communications. In some examples, however, one or more of the UL RX points 715, 720, and 725 may be configured to transmit at least some DL communications.

The RAN 702 is an example of a network having an UL dense deployment configured to improve one or both of UL coverage and UL capacity. More particularly, the one or more UL Rx points 715, 720, and 725 may be included within the RAN 702 to improve one or both of UL coverage and UL capacity. For example, the UE 710 may receive DL communications 735 transmitted by the base station 705. In some instances, however, the UE 710 may transmit UL communications 740 to the UL Rx point 715, rather than to the base station 705. The UL Rx point 715 may then transmit the UL communications 740, or at least the content thereof, to the base station 705 via the backhaul connection 730a.

An UL dense deployment, such as shown in FIG. 7, can reduce the UL path-loss, which is helpful when UL coverage or UL capacity are a bottleneck for communications in the RAN 702. Additionally, expanding network capabilities of the RAN 702 by including an UL dense deployment of UL Rx points that receive UL communications, but do not transmit DL communications, can be less costly and less complex than expanding network capabilities by including further base stations configured for both UL and DL communications.

In some examples, the base station 705 and UE 710 employ a supplemental uplink (SUL) 745, which is an additional UL carrier for the RAN 702 that supplements a normal UL carrier (NUL) of the RAN 702. Accordingly, in some examples, the RAN 702 includes two UL carriers (SUL 745 and NUL) and one DL carrier for communications between the UE 710 and the base station 705. Generally, UL communications from the UE 710 are either on the NUL or the SUL 745, but not both the NUL and SUL 745. In some examples, the SUL 745 may use lower frequency than the NUL, which can improve the transmission distance of UL communications from the UE 710. The SUL 745 may improve one or both of UL coverage and UL capacity of the RAN 702.

In typical UL communications from the UE 710 to the base station 705 (e.g., via the NUL), the UE 710 may select a power transmission level based on a measurement of a DL signal that the UE 710 has received from the base station 705. For example, the UE 710 may determine a path-loss variable for a DL signal based on a measurement of the DL signal (e.g., a DL reference signal). The UE 710 may then predict the path-loss that an UL communication to the base station 705 will experience based on the determined path-loss of the DL communication, and then determine a sufficient strength or power level for an UL communication to reach the base station 705. For a typical UL communication, such a procedure may result in a desirable UL power level. A desirable power level for an UL communication may refer to, for example, a power level that is not too low such that the UL communication is unlikely to be received and/or properly decoded by a base station, and that is not too high such that the UE is unnecessarily consuming power to transmit the UL communication.

However, path-loss for UL communications from the UE 710 to an UL Rx point (e.g., UL Rx point 715) or to the base station 705 via the SUL 745 may not correspond to path-loss for DL communications from the base station 705 to the UE 710. Accordingly, if the UE relies on a path-loss variable based on a measurement of a DL signal when calculating an UL power level for one of these scenarios, the resulting UL power level may be higher or lower than desired given the actual UL path-loss. For example, the UL Rx point 715 may be closer to the UE 710 than the base station 705 and, thus, signals transmitted between the UE 710 and UL Rx point 715 may experience less path-loss than signals transmitted between the UE 710 and the base station 705. Accordingly, it may be desirable and advantageous for the UE 710 to use a lower power level to transmit UL communications to the UL Rx point 715 than may be necessary to transmit UL communications to the base station 705 and inferred by measurement of DL signals from the base station 705. For example, by reducing the power level, the UE 710 may consume less power when transmitting an UL communication and extend battery life. Similarly, signals transmitted between the UE 710 and the base station 705 using the SUL 745 may experience less path-loss than signals transmitted between the UE 710 and the base station 705 using the NUL. Accordingly, it may be desirable and advantageous for the UE 710 to use a lower power level to transmit UL communications to the base station 705 using the SUL than may be necessary to transmit UL communications to the base station 705 via the NUL and inferred by measurement of DL signals from the base station 705.

Initially, the UE 710 may transmit UL communications at power levels that the UE 710 determines based on measuring a DL signal from the base station 705 in a standard manner (i.e., without accounting for whether the UE 710 may be transmitting the UL communication to an UL Rx point, via the SUL 745, or in another scenario in which the UL communication may experience a different path loss than experienced by a DL communication). Over time, as the UE 710 transmits UL communications via the UL Rx point 715 or via the SUL 745, the UE 710 may determine to adjust or reduce transmission power to a more desirable level for such UL communications, reducing power consumption per transmission. For example, the base station 705 may determine that the power level at the reception point of the UL communications (e.g., at the base station 705 or UL Rx point 715) is above some threshold or otherwise excessive. In turn, the base station 705 may indicate to the UE 710 to reduce or adjust transmission power, for example, by sending transmit power control (TPC) commands indicating to change the UL transmission power level. The base station 705 may send TPC commands regularly over the course of DL communications such that the transmission power level of the UE 710 is incrementally changed to a desired transmission power level. Further, the desired transmission power level may change over time, and the TPC commands may allow the UE 710 to follow the changing desired transmission power level.

Although the power level of UL communications may be honed to a more desirable power level over time, certain communication procedures cause the UE 710 to reset or otherwise change the power level. In this case, the UE 710 may again determine the power level for UL communications based on a measured DL signal from the base station 705 in a standard manner. For example, the UE 710 may determine a power level for an initial communication to a base station in a random access procedure (e.g., for the physical random access channel (PRACH)) based on measuring a DL signal from the base station 705 in a standard manner, even though the UE 710 may have recently had access with base station 705 and used another power level that was more desirable. Such a random access procedure initiated when a UE 710 has, or recently had, access with the base station 705 may be referred to as a random access procedure after initial access. A random access procedure after initial access may occur, for example, as part of a beam failure recovery (BFR) procedure or in response to a PDCCH order from a base station. In some examples, a contention-based random access procedure is initiated as part of a BFR procedure, and a contention-free random access procedure is initiated in response to a PDCCH order being received by a UE.

FIG. 8A is a call flow diagram 800 of an example of a contention-based random access procedure as described in 3GPP specifications for 5G NR. As shown, a scheduled entity 802, such as a UE, communicates with a scheduling entity 804, such as a base station or gNB. The description below will describe the scheduled entity 802 as a UE, and the scheduling entity 804 as a base station, although it can be appreciated that in other configurations other scheduled entities and scheduling entities could be substituted, as appropriate. Furthermore, it should be appreciated that the UE 802 may be implemented by the scheduled entity 600 and that the base station 804 may be implemented by the network node 500. Additionally, it should be appreciated that the UE 710 of FIG. 7 may serve as the UE 802, and that the base station 705 of FIG. 7 may serve as the base station 804.

As illustrated, the UE 802 may receive system information (e.g., via a system information block, SIB) 801 from the base station 804. For example, the base station 804 may periodically broadcast the system information over a corresponding cell, and/or the UE 802 may request an on-demand transmission of the system information. The SIB can contain system information that includes cell access information that, when received by the UE 802, may enable the UE 802 to begin a random access procedure.

The UE 802 may transmit a RACH preamble 803 to the base station 804 over a physical random access channel (PRACH). This message 803 may also be referred to as random access request or Message 1 (MSG1) 803. If the base station 804 receives MSG1 803, the base station 804 can derive a random access-radio network temporary identifier (RA-RNTI) corresponding to the UE 802 (e.g., based on MSG1 803).

If the base station 804 properly receives and decodes the MSG1 transmission, then in response, the base station 804 may transmit a random access response (RAR) 806 to the UE. For example, the base station 804 may transmit a PDCCH including a DCI with a CRC scrambled by the RA-RNTI, and a corresponding PDSCH including the RAR 806, also referred to as Message 2 (MSG2) 806.

Thus, after transmitting MSG1 803, the UE 802 may monitor for a random access response (RAR) message 806 from the base station 804. That is, the UE 802 may monitor for a PDCCH including a DCI with a CRC scrambled by the RA-RNTI. However, if the base station 804 does not properly receive or decode the MSG1 transmission, then the base station 804 may not transmit such a response. Here, if the UE 802 does not receive its expected response, e.g., after a suitable timeout period, the UE 802 may retransmit MSG1 803 one or more subsequent times (for example, at successively incrementing power levels).

In the illustrated call flow 800, the UE 802 receives the RAR message 806 from the base station 804, including a PDCCH that carries a DCI with a CRC scrambled by the RA-RNTI; and a corresponding PDSCH carrying other information of the MSG2/RAR 806. Among other things, this random access response (RAR) message 806 may provide the UE 802 with a grant or scheduling information indicating UL resources for the UE 802 to use for an UL transmission (e.g., for MSG3, described further below). Furthermore, this random access response message 806 may provide the UE 802 with a temporary cell-radio network temporary identifier (TC-RNTI), which the UE 802 may employ in subsequent phases of the random access procedure, described further below.

When the UE 802 receives the random access response 806, the UE may then transmit message 3 (MSG3) 808 of the random access procedure. Here, MSG3 may include any suitable information, and in some examples, may be located on a PUSCH. Further, the UE 802 may utilize resources corresponding to the UL grant received in the DCI in the RAR message 806.

After transmitting MSG3 808, the UE 802 may monitor for a PDCCH transmission as a response from the base station 804. Here, if the base station 804 correctly receives and decodes MSG3 808, the base station 804 may transmit message 4 (MSG4) 810 of the corresponding random access procedure.

FIG. 8B is a call flow diagram 850 of an example of a contention-free random access procedure as described in 3GPP specifications for 5G NR. Similar to the description of FIG. 8A, the description below will describe the scheduled entity 802 as a UE, and the scheduling entity 804 as a base station, although it can be appreciated that in other configurations other scheduled entities and scheduling entities could be substituted, as appropriate.

As illustrated, the UE 802 may receive a random access preamble assignment 855 from the base station 804. For example, the assignment 855 may allocate a random access preamble to the UE 802. The assignment 855 may be sent using, for example, radio resource control (RRC) signaling, downlink control information (DCI) signaling, or other signaling.

In response to receiving the assignment 855, the UE 802 may transmit a RACH preamble 860 to the base station 804 over a physical random access channel (PRACH). This preamble 860 may also be referred to as random access request or Message A (MSGA). The preamble 860 may include the allocated preamble indicated by the assignment 855.

If the base station 804 properly receives and decodes the MSGA 860, then in response, the base station 804 may transmit a random access response (RAR) 865 to the UE 802. The RAR 865 may be also referred to as Message B (MSGB). Among other things, this random access response message 865 may provide the UE 802 with a grant or scheduling information indicating UL resources for the UE 802 to use for an UL transmission.

When a random access procedure, such as the procedures of FIGS. 8A and 8B, is initiated, a UE may send an initial message of the random access procedure using a power setting based on a measurement of a DL signal received from the base station in a standard manner. For example, the UE (e.g., UE 802) may transmit a MSG1 803 or MSGA 860 at an UL power level equal to $P_{PRACH,b,f,c}(i)$ as defined by the following equation (1):

$$P_{PRACH,b,f,c}(i) = \min\{P_{CMAX,f,c}(i), P_{PRACH,target,f,c} + PL_{b,f,c}\} \text{ [dBm]} \quad (1)$$

Here, b refers to UL bandwidth part; $f$ refers to carrier frequency; c refers to serving cell; i refers to a transmission occasion; $P_{CMAX,f,c}(i)$ refers to a maximum UE output power level for the carrier frequency $f$ of the serving cell c; $P_{PRACH,target,f,c}$ refers to a target reception power for the preamble, which may be RRC configured as part of PRACH configuration parameters (e.g., "preambleReceivedTargetPower"), and may also have an offset (DELTA_PREAMBLE) added to the value, depending on a particular PRACH format; and $PL_{b,f,c}$ refers to path-loss for the UL bandwidth part b of the carrier frequency $f$ of the serving cell c. For the initial message of the random access procedure, $PL_{b,f,c}$ is based on a downlink reference signal (DL RS). For example, if the random access procedure is for an initial access to the base station by the UE, the DL RS is a synchronization signal block (SSB) associated with the random access procedure. In some examples, $PL_{b,f,c}$ may equal the measured power of the DL RS (e.g., in decibel-milliwatts (dBm)) minus a higher layer filtered average received power (RSRP).

As noted above, when a random access procedure, such as the procedures of FIGS. 8A and 8B, is initiated after initial access of a UE with a base station has already occurred, a UE may also send an initial message of the random access procedure using a power setting based on a measurement of a DL signal received from the base station in a standard manner. For example, the above equation for $P_{PRACH,b,f,c}(i)$ may be used for a random access procedure initiated as part of a beam failure recovery procedure and for a random access procedure triggered by a PDCCH order. When the random access procedure is initiated as part of a beam failure recovery procedure, the DL RS that is measured to calculate PL may be anew identified candidate beam from a candidate list (q_new), which can be an SSB or a CSI-RS. When the random access procedure is triggered by a PDCCH order, the DL RS that is measured to calculate PL may again be an SSB or a CSI-RS.

Thus, even though a more desirable UL power level may have been determined and used by the UE in previous UL communications, this power setting may not be used for the initial message in the random access procedure. In some aspects, this disclosure provides a process the process 900 of FIG. 9) for a wireless communication device (e.g., a UE) to determine an UL power level for an initial message in a random access procedure based on an UL power level calculation technique selected from a plurality of UL power level calculation techniques. In some examples, the process 900 is executed in response to a UE (e.g., the UE 710) determining to execute a random access procedure. The UE may determine to execute a random access procedure to obtain initial access to a base station (e.g., the base station 705) or after initial access to a base station as part of a beam failure recovery procedure to again gain access to the base station or in response to a PDCCH order from the base station. The selected UL power level calculation technique may provide an improved UL power level that more closely corresponds to UL path-loss. Therefore, for example, the UE may transmit UL communications in a random access procedure after initial access that uses less power than would otherwise be used in an initial message in a random access procedure, but that is still at a sufficient strength to be received by an intended recipient.

FIG. 9 is a flow chart illustrating an exemplary process 900 for wireless communication in accordance with some aspects of the present disclosure. As described below, a particular implementation may omit some or all illustrated features, and may not require some illustrated features to implement all embodiments. In some examples, the scheduled entity 600 illustrated in FIG. 6 may be configured to carry out the process 900. The process 900 is described with respect to a UE and a base station and, in particular, the UE 710 and the base station 705 of FIG. 7. However, it can be appreciated that, in other configurations, other scheduled entities and scheduling entities could be substituted, as appropriate. In some examples, any suitable apparatus or means for carrying out the functions or algorithm described below may carry out the process 900.

At block 905, the UE 710 receives an indication of an UL power level calculation technique for a random access procedure. The UL power level calculation may be one of a plurality of available UL power level calculation techniques that the UE may implement to determine an UL power level. The plurality of available UL power level calculation techniques may be included, for example, as part of the UL power level determination instructions 654 or UL power level determination circuit 642. The available UL power level calculation techniques may include, for example, one or more of the following: (1) a DL RS calculation technique (also referred to as a first or standard calculation technique), (2) an accumulated TPC command calculation technique, (3) a partial path-loss compensation calculation technique, and (4) an indicated UL path-loss calculation technique. The accumulated TPC command calculation technique, the partial path-loss compensation calculation technique, and the indicated UL path-loss calculation technique may each be generically referred to as an UL path-loss-based power level calculation technique and also as an alternate UL power level calculation technique, or collectively referred to as UL path-loss-based power level calculation techniques and also as alternate UL power level calculation techniques.

In some examples, the base station 705 transmits the indication to the UE 710 via control signaling. For example, the indication may be provided via control signaling using one or more of the following: radio resource control (RRC)

signaling, medium access control control element (MAC-CE), and downlink control information (DCI). The indication may be a unique identifier that identifies one particular UL power level calculation technique from the plurality of UL power level calculation techniques. In some examples, the indication provide further information that is used in implementation of the indicated UL power level calculation technique, as described in further detail below.

As block 910, the UE 710 determines an UL power level for an initial message in the random access procedure using the UL power level calculation technique. When the UL power level calculation technique is the DL RS calculation technique, the UE 710 may calculate an UL power level based on a measurement of a DL RS received by the UE 710 from the base station 705. For example, the UE 710 may calculate the UL power level for the initial message to be equal to $P_{PRACH,b,f,c}(i)$ as defined in the above-described equation (1). The DL RS calculation technique may be indicated, for example, when the random access request is being initiated for the UE 710 to gain initial access to the base station 705. In such instances, prior power level information about UL communications from the UE 710 may not be available and, accordingly, the standard DL RS calculation technique may be used.

When the UL power level calculation technique is one of the UL path-loss-based power level calculation techniques, the UE 710 may calculate an UL power level using another approach. For example, when the UL power level calculation technique is the accumulated TPC command calculation technique, the UE 710 may calculate an UL power level based on one or more TPC commands that the UE 710 previously received from the base station 705. For example, the UE 710 may calculate the UL power level based on an accumulated power command that includes an accumulation of power commands (e.g., TPC commands) received before transmitting the initial message. An example process 1000 for implementing the accumulated TPC command calculation technique is shown and described with respect to FIG. 10.

When the UL power level calculation technique is the partial path-loss compensation calculation technique, the UE 710 may calculate an UL power level using a partial path-loss compensation factor. An example process 1200 for implementing the partial path-loss compensation calculation technique is shown and described with respect to FIG. 12.

When the UL power level calculation technique is the indicated UL path-loss calculation technique, the UE 710 may calculate an UL power level using an indicated UL path-loss value that corresponds to an UL path-loss. An example process 1300 for implementing the indicated UL path-loss calculation technique is shown and described with respect to FIG. 13.

At block 915, the UE 710 transmits the initial message using the UL power level that was determined in block 910. For example, in the case of a contention-based random access procedure, the UE 710 may transmit a random access request message (see, e.g., MSG1 803 of FIG. 8A) using the UL power level. Further, in the case of a contention-free random access procedure, the UE 710 may transmit a random access request message (see, e.g., MSGA 860 of FIG. 8B) using the UL power level. In each case, the UE 710 may employ a transceiver of the UE 710 (see, e.g., the transceiver 610 of FIG. 6) to transmit the initial message at the UL power level. For example, the UE 710 may configure the transceiver to transmit the initial message at the UL power level by setting a gain value of an amplifier of the transceiver to a value that corresponds to the UL power level. For example, with reference to FIG. 6, the processing system 614 may include a mapping (e.g., via a lookup table or dynamically calculated equation) of UL power levels to gain levels for the transceiver 610, and may use the mapping to identify a gain level that corresponds to the UL power level determined in block 910. The processing system 615 may then communicate the gain level and the initial message to the transceiver 610. The transceiver 610 may then drive a connected antenna using the amplifier configured with the gain level to wirelessly transmit the message using the UL power level.

As noted above, when the UL power level calculation technique is one of the UL path-loss-based power level calculation techniques, the UE 710 may determine an UL power level for block 910 using one of the processes 1000 of FIG. 10, 1200 of FIG. 12, or 1300 of FIG. 13.

FIG. 10 illustrates a process 1000 that may be implemented by the UE 710 to perform the accumulated TPC command calculation technique and, thereby, implement block 905 of FIG. 9. More particularly, FIG. 10 is a flow chart illustrating an exemplary process 1000 for determining an UL power level for an initial message in the random access procedure using an accumulated TPC command calculation technique, in accordance with some aspects of the present disclosure. As described below, a particular implementation may omit some or all illustrated features, and may not require some illustrated features to implement all embodiments. In some examples, the scheduled entity 600 illustrated in FIG. 6 may be configured to carry out the process 1000. The process 1000 is described with respect to a UE and a base station and, in particular, the UE 710 and the base station 705 of FIG. 7. However, it can be appreciated that, in other configurations, other scheduled entities and scheduling entities could be substituted, as appropriate. In some examples, any suitable apparatus or means for carrying out the functions or algorithm described below may carry out the process 1000.

In block 1005, the UE 710 selects an accumulated power command from one or more accumulated power commands maintained by the UE 710. In some examples, when the indication received by the UE 710 in block 905 indicates the accumulated TPC command calculation technique, the indication may also indicate which one of the accumulated power commands to select from a plurality of accumulated power commands maintained by the UE 710 for use by the UE 710 in the calculation technique. In some examples, the particular accumulated power command to be used is fixed, and the UE 710 selects this particular accumulated power command by default. An accumulated power command may also be referred to as a closed loop power control adjustment state, or a power control adjustment state.

Each of the one or more accumulated power commands is an accumulation (e.g., sum) of power commands (e.g., TPC commands) received from the base station 705 over time (e.g., before the process 900 or 1000 is triggered). For example, the UE 710 may receive TPC commands from the base station 705 over the course of communications between the UE 710 and the base station 705. The base station 705 may send the TPC commands to the UE 710 to influence the UL power level of UL communications that the UE 710 transmits. For example, the base station 705 may determine that an UL communication power level at the point of reception is less than a particular threshold, and transmit a TPC command to the UE 710 on a downlink resource to indicate to the UE 71 to increase the UL power level of UL communications. Likewise, the base station 705 may determine that an UL communication power level at the point of reception is greater than a particular threshold, and transmit a TPC command to the UE 710 on a downlink resource to indicate to the UE 710 to decrease the UL power level of UL communications. Upon receipt of each new TPC command from the base station 705, the UE 710 may sum a current value of the accumulated power command with the newly received TPC command.

Additionally, the UE 710 may maintain more than one power control adjustment state, and the base station 705 may indicate for which power control adjustment state a TPC command is intended to modify. For example, the UE 710 may maintain: two power control adjustment states for PUSCH (e.g., $f(i,l)$ where l=0 for the first state or l=1 for the second state), two power control adjustment states for PUCCH (e.g., $g(i,l)$ where l=0 for the first state or l=1 for the second state), and one power control adjustment state for SRS (e.g., $h(i)$). When providing a TPC command, the base station 705 may indicate to the UE 710 which of these power control adjustment states that the UE 710 should modify based on the TPC command. The two PUSCH power control adjustment states may indicate a power level adjustment for PUSCH communications, and the base station 705 may indicate for which PUSCH power control adjustment state a particular TPC command is intended using the index l. The two PUCCH power control adjustment states may indicate a power level adjustment for PUCCH communications, and the base station 705 may indicate for which PUCCH power control adjustment state a particular TPC command is intended using the index l. The SRS power control adjustment state may indicate a power level adjustment for SRS communications. In some examples, the UE 710 maintains more or fewer power control adjustment states for the PUSCH, the PUCCH, and/or the SRS, and/or maintains one or more power control adjustment states for other uplink resources.

In block 1010, the UE 710 may calculate the UL power level for an initial message in the random access procedure using the selected accumulated power command. For example, the UE 710 may calculate the UL power level using the following equation (2), which is similar to equation (1), but also includes an addition of a TPC accumulation function $e(i,l)$.

$$P_{PRACH}(i,l) = \min\{P_{CMAX}(i), P_{PRACH,target} + PL_{b,f,c} + e(i,l)\} \text{ [dBm]} \quad (2)$$

The TPC accumulation function $e(i,l)$, also referred to as a power control adjustment state e, may be set equal to one of the power control adjustment states of the UE 710, which, as noted, may be identified by the indication that the UE 710 receives in block 905. For example, the indication may indicate to use the power control adjustment state for PUSCH where l=0, in which case, $e(i, l) = f(i, 0)$. Accordingly, the UE 710 may calculate an UL power level ($P_{RACH}$) that is adjusted by the TPC accumulation function $e(i,l)$, relative to the level that would result through use of the UL power level equation (1).

FIG. 11 shows a timeline 1100 that illustrates an example of a UE implementing an accumulated TPC command calculation technique like described with respect to some examples of the process 1000 of FIG. 10. More particularly, the timeline 1100 illustrates: PUSCH communication events including PUSCH communications and TPC commands received by the UE 710 for PUSCH; resulting values over time of a power control adjustment state $f$ (also referred to as a TPC accumulation function $f$); and the power control adjustment state e used by the UE 710 for a random access procedure. The timeline 1100 is described with respect to the UE 710 and base station 705; however, the timeline 1100 is also be applicable to other scheduling entities and scheduled entities.

Additionally, for purposes of the example timeline 1100, the UE 710 is presumed to have received an indication (e.g., in block 905 of FIG. 9) indicating for the UE 710 to set the power control adjustment state e equal to the TPC accumulation function $f$ for PUSCH shown in FIG. 11. Further, at the start of the timeline 1100 (i.e., at time (t)=0), $f$ is presumed to be zero.

In the timeline 1100, the UE 710 receives a first TPC command 1102 from the base station 705 that commands an increase in UL power of +3 dBm. The UE 710 receives the first TPC command 1102 as part of a DCI scheduling uplink signal. In response to the TPC command 1102, the UE 710 sets the TPC accumulation function $f$ to +3 dBm. The UE 710 then transmits a PUSCH communication 1104 with a power level determined using the current value of the TPC accumulation function (i.e., $f=+3$).

For example, the power level for the PUSCH communication 1104 ($P_{PUSCH}$) may be calculated using the following equation (5):

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l)^{[dB]} \end{cases} \quad (5)$$

Here, b refers to UL bandwidth part; $f$ (in subscript) refers to carrier frequency; c refers to serving cell; i refers to a transmission occasion; j refers to a parameter set configuration index; $q_d$ refers to a reference signal (RS) index for the active DL bandwidth part; $P_{CMAX,f,c}(i)$ refers to a maximum UE output power level for the carrier frequency $f$ of the serving cell c; $P_{O\_PUSCH,b,f,c}(j)$ refers to a target reception power level for the recipient; M refers to bandwidth of the PUSCH resource assignment expressed in number of resource blocks; $\alpha$ refers to a path-loss compensation parameter that has a default value of 1; and $PL_{b,f,c}(q_d)$ refers to path-loss for the UL bandwidth part b of the carrier frequency $f$ of the serving cell c; $\Delta_{TF,b,f,c}(i)$ refers to a value for transmission format of the UL communication; and $f_{b,f,c}(i,l)$ refers to the TPC accumulation function having index l (e.g., index l=0 or 1) for PUSCH for the UL bandwidth part b of the carrier frequency $f$ of the serving cell c. The value of $f_{b,f,c}(i,l)$ may be calculated using the following equation (6):

$$f_{b,f,c}(i,l) = \Delta P_{rampup,b,f,c} + \delta_{msg2,b,f,c} \quad (6)$$

Here, $\Delta P_{rampup,b,f,c}$ may equal a total power ramp-up that occurred when sending random access requests (see, e.g., MSG1 803 in FIG. 8A). For example, with reference to FIG. 8A, if a MSG1 803 is transmitted by the UE 802 as part of a random access procedure, and the UE 802 does not receive a random access response (RAR) 806 within a certain amount of time, the UE 802 may send another MSG1 803 at an increased power level. The UE 802 may continue to retransmit MSG1s 803 until a RAR 806 is received, incrementally increasing the power level for each MSG1 803, until a maximum power level is reached or a maximum number of MSG1s 803 have been transmitted. Referring again to equation (6), $\delta_{msg2,b,f,c}$ may equal a power level of a TPC command indicated in a random access response (RAR) 806.

Returning to the timeline 1100 of FIG. 11, after transmitting the PUSCH communication 1104, the UE 710 receives three successive TPC commands 1106, 1108, and 1110, each indicating to reduce the TPC accumulation function $f$ by −1 dBm. The UE 710 receives the TPC commands 1106 and 1110 as part of respective GC-DCI (DCI format 2_2) signals, and receives the TPC command 1108 as part of a DCI scheduling uplink signal.

Next, the UE 710 transmits a PUSCH communication 1112 using the current value of the TPC accumulation function (i.e., $f$=+1). Although three TPC commands of −1 have been received by the UE 710 since the PUSCH communication 1104 when f=+3, in this example, the UE 710 received the TPC command 1110 too recently to take the command into account. In other words, the UE 710 did not have sufficient time to take into account the TPC command 1110 before calculating the power level for transmitting the PUSCH communication 1104. Accordingly, for the PUSCH communication 1112, $f$=+3−1−1=+1.

Next, the UE 710 receives two further TPC commands 1114 and 1116, each indicating to reduce the TPC accumulation function $f$ by −1 dBm. The UE 710 receives the TPC commands 1114 and 1116 as part of respective GC-DCI (DCI format 2_2) signals.

The UE 710 then transmits a random access request (MSG1) 1118 in accordance with a contention-based random access procedure, such as shown in FIG. 8A. Referring back to equation (2), the UE 710 calculates a power control adjustment state e, and then calculates an UL power level ($P_{PRACH}(i,l)$), using the power control adjustment state e. The UE 710 then transmits the MSG1 1118 at the UL power level ($P_{PRACH}(i,l)$). As noted, for the timeline 1100, the UE 710 is presumed to have received an indication that the UE 710 is to set the power control adjustment state e equal to the TPC accumulation function $f$. Accordingly, because the TPC accumulation function $f$=+1−1−1−1=−2 dBm at the point of calculating the power level for transmitting the MSG1 1118, the power control adjustment state e is set equal to −2 dBm. To explain further, as previously noted, the TPC accumulation function $f$ at the time of PUSCH communication 1112 (i.e., $f$=+1 dBm) did not take into account the TPC command 1110 because the UE 710 received the TPC command 1110 too late. However, when calculating the TPC accumulation function $f$ at the time of MSG1 1118, the UE 710 is able to take the TPC command 1110 into account. Thus, the UE 710 adjusts the TPC accumulation function $f$, at least by the time of the PUSCH communication 1112 ($f$=1 dBm), according to the TPC command 1110 (−1 dBm), the TPC command 1114 (−1 dBm), and the TPC command 1116 (−1 dBm), resulting in $f$=−2 dBm.

Similar to when calculating the TPC accumulation function $f$ for the PUSCH communication 1112, the UE 710 may not take into account TPC commands received too recently with respect to the time when the UE 710 transmits the MSG1 1118. That is, the UE 710 determines the TPC accumulation function $f$ or power control adjustment state e without considering TPC commands received very shortly before transmitting the MSG1 1118. For example, as illustrated, the UE 710 does not base the determination of the power control adjustment state e on TPC commands received within a threshold time period 1120 before the UE 710 transmits the MSG1 1118. The example in of the timeline 1100 presumes that the UE 710 does not receive TPC commands in the threshold time period 1120; however, in other examples, the UE 710 receives TPC commands in the threshold time period 1120 and does not take these TPC commands into account when calculating the TPC accumulation function $f$ (and, thus, power control adjustment state e).

In response to receiving the MSG1 1118, the base station 705 transmits the random access response (RAR) 1122. The RAR 1122 includes a TPC command ($\delta_{msg2}$=−1 dBm) indicating to the UE 710 to reduce the TPC accumulation function $f$ by −1 dBm.

The UE 710 then transmits a MSG3 PUSCH communication 1124 in accordance with the contention-based random access procedure. The UE 710 transmits the MSG3 PUSCH communication 1124 at an UL power level that is based the current value of the TPC accumulation function (i.e., $f$=−3 dBm). Accordingly, in some examples, after transmitting the initial message, the UE 710 determines an updated UL power level for a subsequent message in the random access procedure (e.g., MSG3 1124) based on the accumulated power command, where the accumulated power command includes an accumulation of TPC commands received before the initial message (MSG1 1118). The updated power level may be calculated using equation (5), where the updated power level is equal to $P_{PUSCH,b,f,c}(i,j,q_d,l)$ and the current value of the TPC accumulation function $f$ (i.e., the accumulated power command) is used as $f_{b,f,c}(i,l)$. As shown in FIG. 11, the TPC accumulation function $f$ may, at the point of the MSG3 1124, incorporate TPC commands received before the initial message (MSG1 1118) in addition to TPC commands provided with the RAR 1112. Thus, additional parameters are incorporated into updated UL power level calculation than would otherwise be used if equation (6) was used for $f_{b,f,c}(i,l)$ to calculate the power level for MSG3 1124. After calculating the updated UL power level, the UE 710 may transmit the subsequent message for the random access procedure using the updated UL power level. To transmit the subsequent message using the updated UL power level, the UE 710 may transmit the message using a transceiver via a similar process as described with respect to block 915.

Next, the UE 710 receives a further TPC command 1126 indicating to reduce the TPC accumulation function $f$ by −1 dBm. The UE 710 receives the TPC command 1126 as part of a DCI scheduling uplink signal.

The UE 710 then transmits a further PUSCH communication 1128. The UE 710 transmits the further PUSCH communication 1128 using the current value of the TPC accumulation function (i.e., $f$=−4 dBm).

Thus, the timeline 1100 illustrates one example technique for the UE 710 to base an initial message (i.e., MSG1 1118) in a random access procedure on an accumulated TPC command. The timeline 1100 also illustrates an example of the UE 710 basing an UL power level for a further or subsequent message in the random access procedure (i.e., the MSG3 1124) on the accumulated TPC command, which incorporates TPC commands from before the initial message. Although the timeline 1100 is provided in the context of a contention-based random access procedure, the UE 710 may calculate an UL power level for an initial message in a contention-free random access procedure (see MSGA 860, FIG. 8B) using a similar technique as used by the UE 710 to calculate the UL power level for the MSG 1 1118 to calculate the UL power level for the MSGA.

Although the UE 710 sets the power control adjustment state e equal to the accumulated TPC command function $f$ in the timeline 1100, in other examples, the UE 710 sets the power control adjustment state e equal to another accumulated TPC command function. For example, in other example, the UE 710 sets the power control adjustment state e equal to: another accumulated TPC command function of PUSCH (e.g., having a different index l than the index l of the TPC command function $f$ in FIG. 11), an accumulated TPC command function of PUCCH (e.g., g(i,l)), or an accumulated TPC command function of SRS (e.g., h(i)). The accumulated TPC command functions g(i,l) and h(i,) may be accumulating functions similar to the function $f$ described with respect to FIG. 11, but the TPC commands that are accumulated for each respective function are associated with the type of communication for which the TPC command(s) is/are sent. For example, the UE 710 accumulates TPC commands received for PUCCH for the accumulated TPC command function g(i,l), and accumulates TPC commands received for SRS for the accumulated TPC command function h(i).

As noted above, FIG. 12 illustrates a process 1200 that may be implemented by the UE 710 to perform the partial path-loss compensation calculation technique and, thereby, implement block 905 of FIG. 9. More particularly, FIG. 12 is a flow chart illustrating an exemplary process 1200 for determining an UL power level for an initial message in the random access procedure using a partial path-loss compensation calculation technique, in accordance with some aspects of the present disclosure. As described below, a particular implementation may omit some or all illustrated features, and may not require some illustrated features to implement all embodiments. In some examples, the scheduled entity 600 illustrated in FIG. 6 may be configured to carry out the process 1200. The process 1200 is described with respect to a UE and a base station and, in particular, the UE 710 and the base station 705 of FIG. 7. However, it can be appreciated that, in other configurations, other scheduled entities and scheduling entities could be substituted, as appropriate. In some examples, any suitable apparatus or means for carrying out the functions or algorithm described below may carry out the process 1200.

In block 1205, the UE 710 determines a DL path-loss parameter ($PL_{b,f,c}$). The UE 710 may determine the DL path-loss parameter ($PL_{b,f,c}$) based on a measurement of a DL signal (e.g., a downlink reference signal (DL RS)). In some examples, $PL_{b,f,c}$ may equal the measured power of the DL RS (e.g., in decibel-milliwatts (dBm)) minus a higher layer filtered average reference signal received power (RSRP). When the process 1200 is ultimately triggered by a random access procedure that is initiated as part of a beam failure recovery procedure, the DL RS that is measured to calculate $PL_{b,f,c}$ may be a new identified candidate beam from a candidate list (q_new) for the base station 705, which can be an SSB or a CSI-RS. When the random access procedure is triggered by a PDCCH order, the DL RS that is measured to calculate $PL_{b,f,c}$ may again be an SSB or a CSI-RS.

In block 1210, the UE 710 determines a path-loss compensation factor ($\alpha$). For example, the base station 705 may indicate the path-loss compensation factor ($\alpha$) to the UE 710 as part of the indication of block 905, or may be a fixed value. In cases where the base station 705 indicates the path-loss compensation factor ($\alpha$), the base station 705 may determine the path-loss compensation factor ($\alpha$) based on measurements of previous UL transmissions. For example, particular measurements or ranges of measurements may map to a particular path-loss compensation factor ($\alpha$) (e.g., via a lookup table). The fixed value may be, for example, stored in a memory of the UE 710 (see, e.g., the memory 605 of FIG. 6), and the UE 710 (e.g., the processor 604 of FIG. 6) may retrieve the fixed value from the memory.

In block 1215, the UE 710 calculates an UL power level for an initial message in the random access procedure based on the DL path-loss parameter ($PL_{b,f,c}$) and the path-loss compensation factor ($\alpha$). For example, the UE 710 may use the UL power level equation (3), below, which is similar to the UL power level equation (1) described above, but for the addition of the path-loss compensation factor ($\alpha$).

$$P_{PRACH,b,f,c}(i) = \min\{P_{CMAX,f,c}(i), P_{PRACH,target,f,c} + \alpha PL_{b,f,c}\} \text{ [dBm]} \quad (3)$$

In the above equation (3), the path-loss compensation factor ($\alpha$), which may have a value less than 1 (i.e., $\alpha<1$), may be used to adjust the impact of the path-loss variable $PL_{b,f,c}$.

Accordingly, the UE 710 may calculate an UL power level ($P_{RACH}$) that is adjusted by the path-loss compensation factor ($\alpha$) relative to the level that would result through use of the UL power level equation (1).

As noted above, FIG. 13 illustrates a process 1300 that may be implemented by the UE 710 to perform the indicated UL path-loss calculation technique and, thereby, implement block 905 of FIG. 9. More particularly, FIG. 13 is a flow chart illustrating an exemplary process 1300 for determining an UL power level for an initial message in the random access procedure using an indicated UL path-loss calculation technique, in accordance with some aspects of the present disclosure. As described below, a particular implementation may omit some or all illustrated features, and may not require some illustrated features to implement all embodiments. In some examples, the scheduled entity 600 illustrated in FIG. 6 may be configured to carry out the process 1300. The process 1300 is described with respect to a UE and a base station and, in particular, the UE 710 and the base station 705 of FIG. 7. However, it can be appreciated that, in other configurations, other scheduled entities and scheduling entities could be substituted, as appropriate. In some examples, any suitable apparatus or means for carrying out the functions or algorithm described below may carry out the process 1300.

In block 1305, the UE 710 determines an UL path-loss parameter. For example, the UE 710 may receive the UL path-loss parameter from the base station 705. For example, the base station 705 may determine a strength or power level of an UL communication from the UE 710 based on a measurement of the power level of the UL communication by the base station 705 or an UL Rx point (e.g., UL Rx point 715). The base station 705 may map the measured power level to a value for the UL path-loss parameter. Accordingly, the UL path-loss parameter may correspond to an UL path-loss of an UL communication from the UE 710. The base station 705 may then transmit the UL path-loss parameter to the UE 710 via control signaling. For example, the base station 705 may transmit the UL path-loss value to the UE 710 as part of the indication of block 905.

In block 1310, the UE 710 calculates an UL power level for an initial message in the random access procedure based on the UL path-loss parameter. For example, the UE 710 may calculate the UL power level using the following UL power level equation (4):

$$P_{PRACH,b,f,c}(i) = \min\{P_{CMAX,f,c}(i), P_{PRACH,target,f,c} + \text{path-loss variable}\} \text{ [dBm]} \quad (4)$$

Here, equation (4) is similar to equation (1), but $PL_{b,f,c}$ of equation (1) is replaced with a path-loss variable. In some examples, the UE 710 may set the path-loss variable equal to an UL path-loss value that is indicated by the base station 705 to the UE 710. In some examples, the UE 710 may set the path-loss variable equal to a path-loss for a DL RS determined by the UE 710 minus the UL path-loss offset indicated by the base station 705 to the UE 710 (i.e., path-loss variable=$PL_{b,f,c}$-indicated UL path-loss offset). Here, the path-loss for the DL RS ($PL_{b,f,c}$) may be calculated as was described above with respect to the process 1200).

Accordingly, the UE 710 may calculate an UL power level ($P_{RACH}$) that is adjusted by an indicated UL path-loss value relative to the level that would result through use of the UL power level equation (1).

Further Examples Having a Variety of Features

Example 1: A method, apparatus, and non-transitory computer-readable medium for receiving, via a transceiver, an indication that indicates an uplink (UL) power level calculation technique to use for a random access procedure; determining an UL power level for an initial message in the random access procedure using the UL power level calculation technique; and transmitting, via the transceiver, the initial message for the random access procedure using the UL power level.

Example 2: A method, apparatus, and non-transitory computer-readable medium of Example 1, wherein the indication is provided via one selected from a group of: radio resource control (RRC) signaling, medium access control control element (MAC-CE), and downlink control information (DCI).

Example 3: A method, apparatus, and non-transitory computer-readable medium of any of Examples 1 to 2, wherein determining the UL power level using the UL power level calculation technique, includes: calculating the UL power level based on an accumulated power command that includes an accumulation of power commands received before the transmitting of the initial message.

Example 4: A method, apparatus, and non-transitory computer-readable medium of Example 3, wherein the accumulated power command indicates a power level adjustment state for at least one selected from a group of: a physical uplink shared channel (PUSCH), a physical uplink control channel (PUCCH), and a sounding reference signal (SRS).

Example 5: A method, apparatus, and non-transitory computer-readable medium of Example 3, wherein the accumulated power command is a first accumulated power command of a plurality of accumulated power commands, and the indication identifies the first accumulated power command of the plurality of accumulated power commands for use in the UL power level calculation technique.

Example 6: A method, apparatus, and non-transitory computer-readable medium of Example 3, further including: determining an updated UL power level for a subsequent message in the random access procedure based on the accumulated power command; and transmitting, via the transceiver, the subsequent message for the random access procedure using the updated UL power level.

Example 7: A method, apparatus, and non-transitory computer-readable medium of any of Examples 1-2, wherein determining the UL power level using the UL power level calculation technique includes: determining a downlink path-loss parameter; determining path-loss compensation factor; and calculating the UL power level based on the downlink path-loss parameter and the path-loss compensation factor.

Example 8: A method, apparatus, and non-transitory computer-readable medium of any of Examples 1-2, wherein determining the UL power level using the UL power level calculation technique includes: determining an uplink path-loss parameter; and calculating the UL power level based on the uplink path-loss parameter.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

What is claimed is:

1. A wireless communication device, comprising:
    one or more processors;
    one or more transceivers communicatively coupled to the one or more processors; and
    a memory communicatively coupled to the one or more processors and configured to store a plurality of different uplink (UL) power level calculation techniques executable by the one or more processors, the plurality of different UL power level calculation techniques comprising a downlink reference signal calculation technique, an accumulated transmit power control (TPC) command calculation technique, a partial path-loss compensation calculation technique, and an indicated UL path-loss calculation technique,
    wherein the one or more processors are configured to cause the wireless communication device to:
        receive, via the one or more transceivers, an indication comprising an identifier that identifies a UL power level calculation technique, from among the plurality of different UL power level calculation techniques stored in the memory, to use for a random access procedure;
        determine an UL power level for an initial message in the random access procedure using the UL power level calculation technique; and
        transmit, via the one or more transceivers, the initial message for the random access procedure at the UL power level.

2. The wireless communication device of claim 1, wherein the indication is provided via one selected from a group of: radio resource control (RRC) signaling, medium access control control element (MAC-CE), and downlink control information (DCI).

3. The wireless communication device of claim 1, wherein the identifier identifies the accumulated TPC command calculation technique of the plurality of different UL power level calculation techniques, and wherein, as part of determining the UL power level using the UL power level calculation technique, the one or more processors are further configured to control the wireless communication device to:
    calculate the UL power level based on an accumulated power command that includes an accumulation of power commands received before transmission of the initial message.

4. The wireless communication device of claim 3, wherein the accumulated power command indicates a power level adjustment state for at least one of: a physical uplink shared channel (PUSCH), a physical uplink control channel (PUCCH), or a sounding reference signal (SRS).

5. The wireless communication device of claim 3, wherein the accumulated power command is a first accumulated power command of a plurality of accumulated power commands, and the indication identifies the first accumulated power command of the plurality of accumulated power commands for use in the UL power level calculation technique.

6. The wireless communication device of claim 3, wherein the one or more processors are further configured to control the wireless communication device to:
    determine an updated UL power level for a subsequent message in the random access procedure based on the accumulated power command; and
    transmit, via the one or more transceivers, the subsequent message for the random access procedure using the updated UL power level.

7. The wireless communication device of claim 1, wherein the identifier identifies the partial path-loss compensation calculation technique of the plurality of different UL power level calculation techniques, and wherein, as part of determining the UL power level using the UL power level calculation technique, the one or more processors are further configured to control the wireless communication device to:
    determine a downlink path-loss parameter;
    determine path-loss compensation factor; and
    calculate the UL power level based on the downlink path-loss parameter and the path-loss compensation factor.

8. The wireless communication device of claim 1, wherein the identifier identifies the indicated UL path-loss calculation technique of the plurality of different UL power level calculation techniques, and wherein, as part of determining the UL power level using the UL power level calculation technique, the one or more processors are further configured to control the wireless communication device to:
    determine an uplink path-loss parameter; and
    calculate the UL power level based on the uplink path-loss parameter.

9. A method of wireless communication operable at a user equipment (UE), comprising:
    receiving an indication comprising an identifier that identifies an uplink (UL) power level calculation technique, from among a plurality of different UL power level calculation techniques stored in memory of the UE and executable by one or more processors of the UE, to use for a random access procedure, the plurality of different UL power level calculation techniques comprising a downlink reference signal calculation technique, an accumulated transmit power control (TPC) command calculation technique, a partial path-loss compensation calculation technique, and an indicated UL path-loss calculation technique;
    determining an UL power level for an initial message in the random access procedure using the UL power level calculation technique; and transmitting the initial message for the random access procedure at the UL power level.

10. The method of claim 9, wherein the indication is provided via one selected from a group of: radio resource control (RRC) signaling, medium access control control element (MAC-CE), and downlink control information (DCI).

11. The method of claim 9, wherein the identifier identifies the accumulated TPC command calculation technique of the plurality of different UL power level calculation techniques, and wherein determining the UL power level using the UL power level calculation technique comprises:
calculating the UL power level based on an accumulated power command that includes an accumulation of power commands received before the transmitting of the initial message.

12. The method of claim 11, wherein the accumulated power command indicates a power level adjustment state for at least one of: a physical uplink shared channel (PUSCH), a physical uplink control channel (PUCCH), or a sounding reference signal (SRS).

13. The method of claim 11, wherein the accumulated power command is a first accumulated power command of a plurality of accumulated power commands, and the indication identifies the first accumulated power command of the plurality of accumulated power commands for use in the UL power level calculation technique.

14. The method of claim 11, further comprising:
determining an updated UL power level for a subsequent message in the random access procedure based on the accumulated power command; and
and
transmitting the subsequent message for the random access procedure using the updated UL power level.

15. The method of claim 9, wherein the identifier identifies the partial path-loss compensation calculation technique of the plurality of different UL power level calculation techniques, and wherein determining the UL power level using the UL power level calculation technique comprises:
determining a downlink path-loss parameter;
determining a path-loss compensation factor; and
calculating the UL power level based on the downlink path-loss parameter and the path-loss compensation factor.

16. The method of claim 9, wherein the identifier identifies the indicated UL path-loss calculation technique of the plurality of different UL power level calculation techniques, and wherein determining the UL power level using the UL power level calculation technique comprises:
determining an uplink path-loss parameter; and
calculating the UL power level based on the uplink path-loss parameter.

17. A wireless communication device, comprising:
means for storing a plurality of different uplink (UL) power level calculation techniques;
means for receiving an indication comprising an identifier that identifies a UL power level calculation technique, from among the plurality of different UL power level calculation techniques that the wireless communication device is configured to perform, to use for a random access procedure, the plurality of different UL power level calculation techniques comprising a downlink reference signal calculation technique, an accumulated transmit power control (TPC) command calculation technique, a partial path-loss compensation calculation technique, and an indicated UL path-loss calculation technique;
means for determining an UL power level for an initial message in the random access procedure using the UL power level calculation technique; and
means for transmitting the initial message for the random access procedure at the UL power level.

18. The wireless communication device of claim 17, wherein the indication is provided via one selected from a group of: radio resource control (RRC) signaling, medium access control control element (MAC-CE), and downlink control information (DCI).

19. The wireless communication device of claim 17, wherein the identifier identifies the accumulated TPC command calculation technique of the plurality of different UL power level calculation techniques, and wherein the means for determining the UL power level using the UL power level calculation technique comprises:
means for calculating the UL power level based on an accumulated power command that includes an accumulation of power commands received before the means for transmitting transmits the initial message.

20. The wireless communication device of claim 19, wherein the accumulated power command indicates a power level adjustment state for at least one of: a physical uplink shared channel (PUSCH), a physical uplink control channel (PUCCH), or a sounding reference signal (SRS).

21. The wireless communication device of claim 19, further comprising:
means for determining an updated UL power level for a subsequent message in the random access procedure based on the accumulated power command; and
means for transmitting the subsequent message for the random access procedure using the updated UL power level.

22. The wireless communication device of claim 17, wherein the identifier identifies the partial path-loss compensation calculation technique of the plurality of different UL power level calculation techniques, and wherein the means for determining the UL power level using the UL power level calculation technique comprises:
means for determining a downlink path-loss parameter;
means for determining a path-loss compensation factor; and
means for calculating the UL power level based on the downlink path-loss parameter and the path-loss compensation factor.

23. The wireless communication device of claim 17, wherein the identifier identifies the indicated UL path-loss calculation technique of the plurality of different UL power level calculation techniques, and wherein the means for determining the UL power level using the UL power level calculation technique comprises:
means for determining an uplink path-loss parameter; and
means for calculating the UL power level based on the uplink path-loss parameter.

24. A non-transitory computer-readable medium storing computer-executable code, comprising code for causing a one or more processors of a wireless communication device to cause the wireless communication device to:
receive an indication comprising an identifier that identifies an uplink (UL) power level calculation technique, from among a plurality of different UL power level calculation techniques stored on the non-transitory computer-readable medium and executable by the one or more processors, to use for a random access procedure, the plurality of different UL power level calculation techniques comprising a downlink reference signal calculation technique, an accumulated transmit power control (TPC) command calculation technique, a partial path-loss compensation calculation technique, and an indicated UL path-loss calculation technique;

determine an UL power level for an initial message in the random access procedure using the UL power level calculation technique; and transmit the initial message for the random access procedure at the UL power level.

25. The non-transitory computer-readable medium of claim 24, wherein the indication is provided via one selected from a group of: radio resource control (RRC) signaling, medium access control control element (MAC-CE), and downlink control information (DCI).

26. The non-transitory computer-readable medium of claim 24, wherein the identifier identifies the accumulated TPC command calculation technique of the plurality of different UL power level calculation techniques, and wherein, to determine the UL power level using the UL power level calculation technique, the non-transitory computer-readable medium further comprises code causing the one or more processors to cause the wireless communication device to:

calculate the UL power level based on an accumulated power command that includes an accumulation of power commands received before transmission of the initial message.

27. The non-transitory computer-readable medium of claim 26, wherein the accumulated power command indicates a power level adjustment state for at least one of: a physical uplink shared channel (PUSCH), a physical uplink control channel (PUCCH), or a sounding reference signal (SRS).

28. The non-transitory computer-readable medium of claim 26, the non-transitory computer-readable medium further comprises code causing the one or more processors to cause the wireless communication device to:

determine an updated UL power level for a subsequent message in the random access procedure based on the accumulated power command; and transmit the subsequent message for the random access procedure using the updated UL power level.

29. The non-transitory computer-readable medium of claim 24, wherein the identifier identifies the partial path-loss compensation calculation technique of the plurality of different UL power level calculation techniques, and wherein, to determine the UL power level using the UL power level calculation technique, the non-transitory computer-readable medium further comprises code causing the one or more processors to cause the wireless communication device to:

determine a downlink path-loss parameter;

determine path-loss compensation factor; and calculate the UL power level based on the downlink path-loss parameter and the path-loss compensation factor.

30. The non-transitory computer-readable medium of claim 24, wherein the identifier identifies the indicated UL path-loss calculation technique of the plurality of different UL power level calculation techniques, and wherein, to determine the UL power level using the UL power level calculation technique, the non-transitory computer-readable medium further comprises code causing the one or more processors to cause the wireless communication device to:

determine an uplink path-loss parameter; and calculate the UL power level based on the uplink path-loss parameter.

* * * * *